(12) United States Patent
Vicars et al.

(10) Patent No.: US 7,849,052 B2
(45) Date of Patent: Dec. 7, 2010

(54) ELECTRONIC DOCUMENT MANAGER

(76) Inventors: Paul David Vicars, 4027 Colonel Glenn Hwy., Dayton, OH (US) 45431; Eric James VanHoose, 4027 Colonel Glenn Hwy., Dayton, OH (US) 45431

( * ) Notice: Subject to any disclaimer, the term of this patent is extended or adjusted under 35 U.S.C. 154(b) by 663 days.

(21) Appl. No.: 11/044,434

(22) Filed: Jan. 27, 2005

(65) Prior Publication Data
US 2005/0165734 A1  Jul. 28, 2005

Related U.S. Application Data

(60) Provisional application No. 60/539,920, filed on Jan. 28, 2004.

(51) Int. Cl.
G06F 17/30 (2006.01)
G06F 15/02 (2006.01)
G06F 17/00 (2006.01)

(52) U.S. Cl. .................................. 707/608; 705/9
(58) Field of Classification Search ............. 707/608; 705/9
See application file for complete search history.

(56) References Cited

U.S. PATENT DOCUMENTS

| | | | | |
|---|---|---|---|---|
| 5,706,452 A * | 1/1998 | Ivanov | | 715/751 |
| 5,819,295 A * | 10/1998 | Nakagawa et al. | | 707/203 |
| 6,003,011 A * | 12/1999 | Sarin et al. | | 705/9 |
| 6,151,583 A * | 11/2000 | Ohmura et al. | | 705/8 |
| 6,553,407 B1 * | 4/2003 | Ouchi | | 709/206 |
| 6,574,629 B1 * | 6/2003 | Cooke et al. | | 707/10 |
| 6,725,428 B1 * | 4/2004 | Pareschi et al. | | 715/205 |
| 7,356,611 B1 * | 4/2008 | Stork et al. | | 709/239 |
| 2002/0111824 A1 * | 8/2002 | Grainger | | 705/1 |

OTHER PUBLICATIONS

"Hummingbird Positioned in the Leader Quadrant in 2004 Enterprise Content Management (ECM) Magic Quadrant", Toronto—Oct. 26, 2004 (www.hummingbird.com), 16 pages.
"Records Manager"; "Content Intelligence Services (CIS)"; "Records Actitvators"; "Content Server"; "Content Applications"; "eRoom Collaboration Products"; "consulting"; (www.documentum.com), 11 pages.
"Enterprise Content Management"; "Document Managerhent"; "Training Courses"; "Professional Services"; (www.hyperwave.com), 17 pages.
Auto-trol Technology Corporation—Training Professional Services, Tech Illustrator; (www.auto-trol.com), 5 pages.

(Continued)

Primary Examiner—Jacob F Bétit
(74) Attorney, Agent, or Firm—Dennis F. Armijo

(57) ABSTRACT

A system and method for managing electronic files and tasks in a way that is intuitive to the users, mimicking their environment, but "Process-Blind'. The system and method comprise a configurable structure that facilitates the accurate filing and subsequent locating of electronic files in underlying document/record management applications. The manager enables users, with permissions, to communicate with each other regarding these files and their work through ad-hoc workflows that are created by the user as needed, then retained as documentation of events. The manager provides an efficient, secure, auditable handling of unstructured data that is free of predetermined inflexible processes and is not dependant on specific underlying document management software.

18 Claims, 40 Drawing Sheets

OTHER PUBLICATIONS

"Business Process Integrated Document Content Management"; "FYI Content"; "FYI Workflow"; "FYI ERM"; "FYI Records"; (www.global360.com).

Stellent, Inc., "Universal Content Management"; "Universal Document Management"; "Stellent Document Management"; "Stellent Collaboration Management"; Stellent Records Management; "Stellent Digital Asset Management"; "Stellent Content Server"; "Imaging & Business Process Management"; (www.stellent.com), 18 pages.

Teamware Office™ 6.1; (www.teamware.net), 68 pages.

80-20 Software; "Document and Records Management Solution"; "Benefits of 80-20 Document Manager"; "Enterprise Content Management"; "80-20 Document Manager"; (www.80-20-com), 17 pages.

Publigen; (www/publigen.com), 12 pages.

Workflow Software; (www.workflowgen.com), 13 pages.

Web Based Project Management Software BPS Project; (www.bpsproject.com), 22 pages.

* cited by examiner

170

172 173

| | | | Chronology Log | |
|---|---|---|---|---|
| User | Date / Time | Action | | Detail |
| Buyer01 | 2004/12/14 14:41:10 | User Comment | | Users can add their own entries. |
| Buyer01 | 2004/12/14 14:40:14 | Open Folder | | |
| Buyer01 | 2004/12/13 17:57:48 | Create Workflow | | Workflow Name: Final Contract - FYI |
| Buyer01 | 2004/12/13 17:56:31 | Open Folder | | |
| Buyer01 | 2004/12/13 17:10:51 | Open Folder | | |
| Buyer01 | 2004/12/13 17:03:03 | Open Folder | | |
| Buyer01 | 2004/12/13 15:18:43 | Open Folder | | |
| Buyer01 | 2004/10/29 17:54:59 | Open Folder | | |
| Engineer02 | 2004/10/29 12:21:41 | Complete WF Task | | Workflow Name: Need you to see this. |
| Engineer01 | 2004/10/29 12:21:17 | Complete WF Task | | Workflow Name: Need you to see this. |
| Buyer01 | 2004/10/29 12:20:53 | Complete WF Task | | Workflow Name: Need you to see this. |
| Buyer02 | 2004/10/29 12:19:49 | Complete WF Task | | Workflow Name: Need you to see this. |
| Buyer02 | 2004/10/29 12:18:47 | Create Workflow | | Workflow Name: Need you to see this. |
| Buyer02 | 2004/10/29 12:18:06 | Open Folder | | |
| Buyer02 | 2004/10/29 12:17:02 | Updated properties of folder state. | | |
| Buyer02 | 2004/10/29 12:16:55 | Updated properties of folder state. | | |
| Buyer02 | 2004/10/29 12:16:42 | Change properties of folder state to inactive | | Closeout date: 2004-10-29 |

171 (Add Entry | Close)

| Move Document | | |
|---|---|---|
| Document Name: download client program from ACME | | Date/Time Imported: 2004-10-29 (11:15 AM) |
| Originator: Buyer01 | | |

| Properties | For System Use Only |
|---|---|
| Working | Imported/Exported File |
|   Originator Only | Locked File |
| Official | |

| | Current | New |
|---|---|---|
| Functional Area: | Purchasing | Purchasing |
| Folder Title: | Repair parts for Old Inventory | Repair parts for Old Inventory |
| Folder Section: | Working | Working ˅ |
| Tab: | Working Files | Please select... ˅ |
| Document Name: | download client program from ACME | download client program from ACME |

Move | Cancel

| Document Copy | |
|---|---|
| Document Name: download client program from ACME | Date:Time Imported: 2004-10-29 (11:15 AM) |
| Originator: Buyer01 | |

| Current | Target |
|---|---|
| Functional Area: Purchasing | Purchasing ▼ |
| Folder Name: Repair parts for Old Inventory | Repair parts for Old Inventory ▼ |
| Folder Section: Working | Working Area Section |
| Tab: Working Files | Working Files/Locked Files |
| Document Name: download client program from ACME | download client program from ACME |
| | ☐ Read Only (also sets original copy) |
| | Copy \| Cancel |

Folder Summary — 190

Status: Active

✏️ Modifying Folder State to Locked Down

*Lockdown date: [_____] 📅

[Save] [Cancel]

Folder Summary

Status: Locked Down
Lockdown Date: 12/07/2004 ✏️

---

Folder Summary — 191

Status: Locked Down
Lockdown Date: 12/07/2004

✏️ Modifying Folder State to Inactive ("Closed out").

Destruction date: [_____] 📅

Batch Number: [0]

Disposition Authority: [(Select a rule) ▼]

[Save] [Cancel]

Folder Summary

Status: Inactive ✏️
Lockdown Date: 12/14/2004
Close Out Date: 12/15/2004
Disposal Authority: AF MAN 37-139 T64-1, R1
Destroy Date: 12/31/2004
Batch Number: 54681

---

Folder Summary — 194

Status: Inactive
Lockdown Date: 12/14/2004
Close Out Date: 12/15/2004
Disposal Authority: AF MAN 37-139 T64-1, R1
Destroy Date: 12/31/2004
Batch Number: 54681

✏️ View or modify properties of folder state Inactive.

☐ Change state to Destruct-Hold

Destruction date: [12/31/2004] 📅

Batch Number: [54681]

Disposition Authority: [AF MAN 37-139 T64-1, R1 ▼]

[Save] [Cancel]

Functional Area List

Functional Area Search

Organization: Premier Business Group One
Functional Area Name:
Description:
Tab:
Section:
User name:

[Search] [Refresh]

[Add Functional Area]

Functional Areas

| Organization | Functional Area | Description | Action |
|---|---|---|---|
| Premier Business Group One | Finance Department | | (Select Action) |
| Premier Business Group One | Human Resources | | (Select Action) |
| Premier Business Group One | Marketing | | (Select Action) |
| Premier Business Group One | Operations | | (Select Action) |
| Premier Business Group One | Program Management | | (Select Action) |

Edit Functional Area

Functional Area Name: Finance Department
Description:
Folder Label: Folder Name
Permissions:
- Create Project: 5
- Folder, Import, Memo, WF: 5
- Chronology Log: 2  ← 312
- Lock Down: 8

[Save] [Cancel]

Identifiers: [add]

| Label | Action |
|---|---|
| Description of Effort | (Select Action) |
| Key Words | (Select Action) |
| Financial Analysis | (Select Action) |

Section List

Search Sections

Organization: All Organizations
Functional Area: All Functional Areas
Section Name:
Description:
Tab:
Type: All Types

[Search] [Refresh]

[Add Section]

Sections

| Organization | Functional Area | Section Name | Type | Description | Action |
|---|---|---|---|---|---|
| Premier Business Group One | Marketing | Advertising | Official | | (Select Action) |
| Test VHA | Contracting | Award | Official | | (Select Action) |
| VHA | HR | Award | Official | | (Select Action) ← 323 |
| Premier Business Group One | Human Resources | Benefits | Official | | (Select Action) |
| Premier Business Group One | Finance Department | Budget Reports | Official | | (Select Action) |
| Premier Business Group One | Program Management | Collaboration Zone | Working | | (Select Action) |
| Premier Business Group One | Marketing | Competition | Official | | (Select Action) |
| Premier Business Group One | Marketing | Direct Marketing Efforts | Official | | (Select Action) |
| Test VHA | Marketing | Direct Sales | Official | | (Select Action) |
| Premier Business Group One | Finance Department | Expenses | Official | | (Select Action) |

|◀ 1 2 3 4 5 ▶▶|

Figure 32

Edit Section

Organization: Premier Business Group One
Functional Area: Program Management
323 —— Section Name: Collaboration Zone
Description:
Section Type: Working
Insert Before: Working
Visible: ☑ Yes

[ Save ] [ Cancel ]

| | | | Tab List | | | | | | | |
|---|---|---|---|---|---|---|---|---|---|---|
| | | | Search Tabs | | | | | | | |
| | | Organization: | All Organizations | | | | | | | |
| | | Functional Area: | All Functional Areas | | | | | | | |
| | | Section: | All Sections | | | | | | | |
| | | Tab Name: | | | | | | | | |
| | | Description: | | | | | | | | |
| | | Section Name: | | | | | | | | |
| | | Permission: | All | Operation: Any | | Level: Any | | | | |
| | | | Search  Refresh | | | | | | | |
| Add Tab | | | | | | | | | | |
| | | | Tabs | | | | | | | |
| Organization | Functional Area | Section Name | Tab Name | Description | S | R | E | D | M | Action |
| Premier Business Group One | Human Resources | Benefits | 401K | | 1 | 2 | 4 | 5 | 5 | (Select Action) |
| Premier Business Group One | Human Resources | Workers Comp | Accident Investigation | | 1 | 2 | 4 | 5 | 5 | (Select Action) |
| Test VHA | Finance | Quickbooks | Account Information | | 1 | 2 | 4 | 6 | 7 | (Select Action) |
| Test VHA | Marketing | Direct Sales | Advertisement | | 1 | 2 | 4 | 6 | 7 | (Select Action) |
| Premier Business Group One | Marketing | Competition | Analyst Reports | | 1 | 2 | 4 | 5 | 5 | (Select Action) |
| Premier Business Group One | Finance Department | Budget Reports | Annual Budget | | 1 | 2 | 4 | 5 | 5 | (Select Action) |
| Test VHA | Human Resources | Official | Applications | | 1 | 2 | 4 | 6 | 7 | (Select Action) |
| Premier Business Group One | Marketing | Other Marketing Activities | Associations and Organizations | | 1 | 2 | 4 | 5 | 5 | (Select Action) |
| Premier Business Group One | Human Resources | Performance | Awards and Recognition | | 1 | 2 | 4 | 5 | 5 | (Select Action) |
| Premier Business Group One | Program Management | Risk Management | Briefings Charts and Materials | | 1 | 2 | 4 | 5 | 5 | (Select Action) |

User List

Search Users

| | |
|---|---|
| Organization: | All Organizations |
| Functional Area: | All Functional Areas |
| Login: | |
| Full Name: | |
| Position: | |
| E-Mail Address: | |
| Global Administrator: | Any |
| Organization Administrator: | Any |
| Functional Area Administrator: | Any |
| Active: | Any |
| Functional Area Level: | Any   Operation: Any |

[Search] [Refresh]

[Add User]

Users

| Login Name | Full Name | Position | E-Mail | Action |
|---|---|---|---|---|
| BMartin | Bob Martin | | bmoody@vhainc.com | (Select Action) |
| MSmith | Mary Smith | | bmoody@vhainc.com | (Select Action) |
| adminuser | | | admin@vhainc.com | (Select Action) |
| bmoody | becky moody | | bmoody@vhainc.com | (Select Action) |
| bossy | Bossy | | bossy@vhainc.com | (Select Action) |
| maggie | Maggie St. Jacques | | mstjacques@vhainc.com | (Select Action) |
| meredith | | | m@vhainc.com | (Select Action) |
| pat | | | p@vhainc.com | (Select Action) |
| user001 | User One | | a@vhainc.com | (Select Action) |
| user002 | User Two | | a@vhainc.com | (Select Action) |

Edit User

Login: BMartin
Full Name: Bob Martin
Position:
E-Mail: bmoody@vhainc.com
Global Administrator: ☐
Status: ⦿ Active  ○ Suspend Login

| Member | Organization | Admin |
|---|---|---|
| ☐ | DEFAULT | ☐ |
| ☐ | Organization 1 | ☐ |
| ☑ | Premier Business Group One | ☐ |

| Member | Functional Area | User Level | Admin |
|---|---|---|---|
| ☑ | Finance Department | 8 | ☐ |
| ☐ | Human Resources | 0 | ☐ |
| ☐ | Marketing | 0 | ☐ |
| ☑ | Operations | 2 | ☐ |
| ☐ | Procurement | 0 | ☐ |
| ☑ | Program Management | 2 | ☐ |

| Member | Organization | Admin |
|---|---|---|
| ☐ | Test VHA | ☐ |
| ☐ | VHA | ☐ |

[Save] [Cancel]

Figure 37

ELECTRONIC DOCUMENT MANAGER

CROSS-REFERENCE TO RELATED APPLICATIONS

This application is based on U.S. Provisional Application Ser. No. 60/539,920 entitled "Electronic Document Manager", filed on Jan. 28, 2004, the teachings of which are incorporated herein by reference.

BACKGROUND OF THE INVENTION

1. Field of the Invention (Technical Field)

The present invention is in the field of Electronic Business Process Management (EM) and more particularly to a method for managing unstructured data in electronic files and workflows, embodied in a software application, that takes advantage of the sophistication of independent document and record management tools while providing the user with a simplified interaction with those tools.

2. Background Art

This invention is a software application for document-intensive work environments that: (1) Provides a very user-friendly and easy to maintain "electronic intersection" between the underlying, existing document and record management software products through use of their APIs; (2) Creates a folder centric "look and feel" that mirrors the user's existing processes for organizing their files; and (3) Gives the user a unique, fast and easy to use means of collaborating with others through use of the EM workflow and shared file access.

In businesses without document/record management software, we often find that files are still maintained as paper copies stored in filing cabinets or boxes. If records are stored electronically, either in lieu of or in addition to paper copies, their organization is usually haphazard. Both methods continue to increase resource requirements, inhibit collaboration, and create security and accountability concerns. However, transition to a paperless work environment is slow or non-existent because existing document management and record management software is inflexible and cumbersome.

The present invention solves this functional problem that manifests itself in the limitations of both the paper processes and in the document and record management products currently available. This problem is especially prevalent in those document-intensive work environments where there are whole organizations or departments of people that are currently inundated with the flow of paper. In order to be efficient and successful, a transition to a new method of record keeping must not force inappropriate and intrusive changes to an organization's current processes. Further, the tool which is employed must be easy to learn at the outset and simple to use for everyone.

The closest method to the present invention can be found in existing document/record management software that may provide acceptable document and record management functionality to the computer savvy. These tools are not for the user who just wants to use the software to get their work accomplished. Unlike EM, these methods do not provide a means of quickly setting up a structure that mirrors the existing paper file plan of the user or provide an easy way to send ad-hoc workflows to collaborate with other users.

The preferred solution to the above problem is an out-of-the-box solution that is designed to emulate existing processes. EM provides this with easily modifiable table-driven setup that can be managed by the user's system administrator. Not only does this allow initial implementation to happen quickly, it ensures that as a business grows and/or changes its processes the EM solution will run along side. This is the challenge that the existing software products have failed to recognize.

EM does not require an understanding of the user's processes but provides a table-driven capability to quickly capture the users file plan as a process enabler. EM provides a folder centric look and feel for the user, which allows the user to file their documents (in their document management software) according to the file plan with which they are familiar. The documents in the file plan can then be secured as an entity (or folder) so that they cannot be altered or changed (from their record management software). This allows these documents to be kept electronically together as one secure bundle. The filing of these documents triggers the capture of basic foundational metric and measurement data that can be used in business process re-engineering. EM also gives the user pre-determined permission to visit other users' folders for information, sharing, etc. This ability to share information by establishing guest privileges for the various users in a workplace allows collaboration to occur without the need to always send a workflow.

A user can establish fixed reusable workflows in EM if desired. However, EM provides the user with the greater ability to send workflows almost instantly without having to establish a fixed, inflexible workflow map. These ad-hoc workflows can be directed to whomever the user chooses by simply selecting the correct user names, group, or function and any files that he'd like to send for review and/or coordination. Such ad-hoc workflows can be reassigned and/or cancelled after they are launched, accommodating the flexibility required in today's dynamic workplace. This ad-hoc workflow capability allows the user to process data and/or documents that have no predictable, unchanging process flow without EM being required to pre-define the workflow with a specific process map, yet still leaving a clear audit trail of the activity that occurred. Other than EM, there are no ad-hoc workflow software products today with these capabilities.

SUMMARY OF THE INVENTION

Disclosure of the Invention

The present invention is a software application that interfaces with and integrates existing document and record management software products. It provides the end-user with the tools that facilitate secure management of their electronic unstructured data files from creation through collaboration to final permanent record storage. The methods used create an interface that mimics the way work is currently done yet is free from predefined inflexible processes.

The invention draws a folder centric structure around electronic file storage that is easily configured for each installation. The model for this folder structure is typically an existing file plan. As a result, the user interface is immediately familiar to the end-user. There is no limit to the number of folder patterns that can exist in any given installation. Each Functional Area within an Organization can be configured uniquely for its purposes.

The folder pattern is subdivided into Sections and Tabs that relate to the specific documents or files that will potentially be stored. Within each Functional Area's folder pattern, permission levels are established for actions that occur at the folder and at the individual tabs. Users are then assigned, with appropriately varying permissions, to one or more Functional Areas where they will do work.

An electronic file placed in the document management database is accessible to the user, if he has the correct permissions, for viewing, editing, copying, moving, or deleting until a user, again with correct permissions, deems that all work on a particular effort is done and "locks" the entire folder containing the document. The invention automatically retains all versions of a file that have existed during its life in EM. Each of these is available to the user for review. As a result of these file handling capabilities, the invention provides a realistic environment for managing work, not just a repository for completed files. It does, on the other hand, also provide a means for moving sets of files, by folder, to permanent record storage, assigning disposition dates, and deleting those folders when they have aged past their disposition date.

The invention provides the capability of issuing ad-hoc workflows. This allows a user to communicate with other users purely as needed, not in conformation with any predefined map or process. The workflow may be addressed to any user(s) the originator chooses and may carry electronic file attachments as well as instructions. Ad-hoc workflows are always related to a particular folder and retained after completion, adding a dimension of audit-ability.

In addition to file version control and workflow history, the invention has built in methods for tracking events which assure accountability. As a by product, event tracking may provide data for any number of business management efforts.

A primary object of the present invention is to provide a folder centric look and feel for the user, which allows the user to place their electronic files into a document/record management database according to the file plan with which they are familiar.

A primary advantage of the present invention is that it provides the user with the ability to send workflows almost instantly without having to establish a fixed, inflexible workflow map.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 19 shows sample entries in a chronological log for a particular folder.

FIG. 21 shows the user interface for moving electronic files.

FIG. 22 shows the user interface for copying electronic files.

FIG. 28 shows the different stages of the folder for Records management phases.

FIG. 30 shows the Administrative Module screen used to search for and manage Functional Areas.

FIG. 31 shows the user interface in the Administrative Module used for editing and managing the Functional Areas.

FIG. 32 shows the Administrative Module screen used to search for and manage Sections.

FIG. 33 shows the user interface in the Administrative Module used for editing Sections.

FIG. 34 shows the Administrative Module screen used to search for and manage Tabs.

FIG. 36 shows the Administrative Module screen used to search for and manage Users.

FIG. 37 shows the user interface in the Administrative Module used for editing Users and managing permission levels.

DESCRIPTION OF THE PREFERRED EMBODIMENTS

Best Modes for Carrying Out the Invention

The present invention involves a system and/or method for managing electronic files in a way that is intuitive to the users, mimicking their environment, but remaining "Process-Blind'. Further, the invention enables the use of ad-hoc workflows, by-passing the need for specifically predefined workflow maps. This invention is particularly suited to the management of unstructured data.

Figure 1:
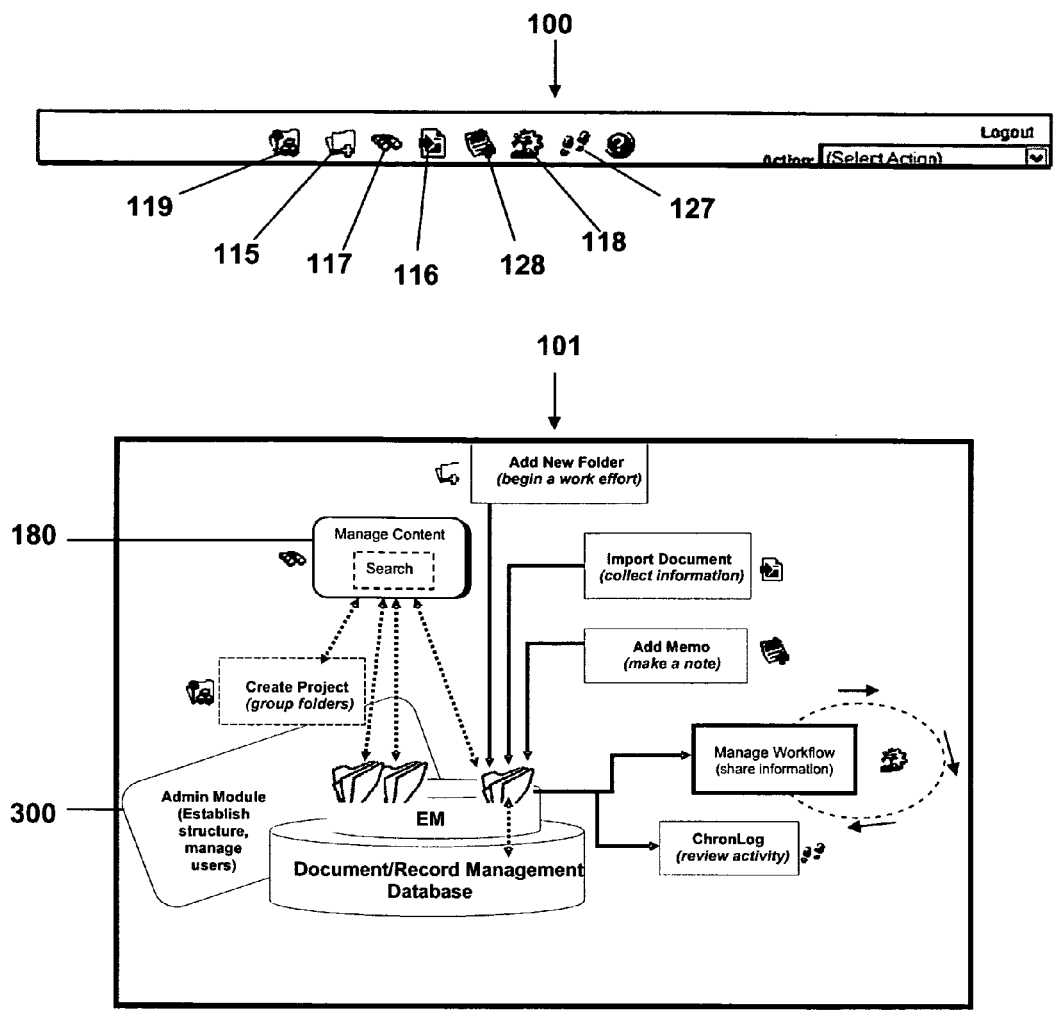
FIG. 1 is an overview of the core features of the invention.

FIG. 1 shows the menu bar 100 used in an instance of the invention with identification of key features accessible from the menu's icons. A diagram 101 represents the way these features are used by EM in its role as emissary between the user and the under-lying document/record management database. Individual elements numbered here from 110 through 300 are discussed in detail with ensuing figures.

Figure 2:
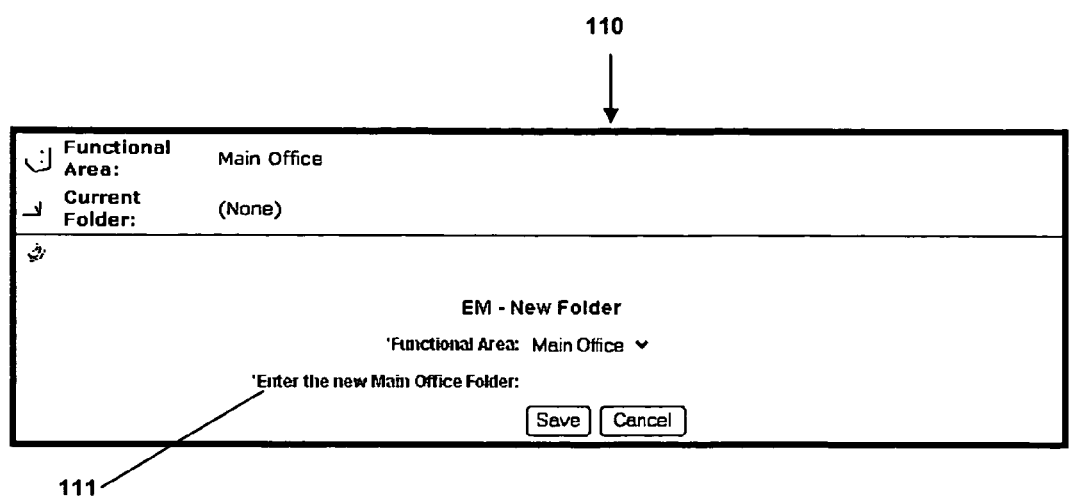
FIG. 2 is a screen shot of the user interface screen to add new folders.
Figure 3:
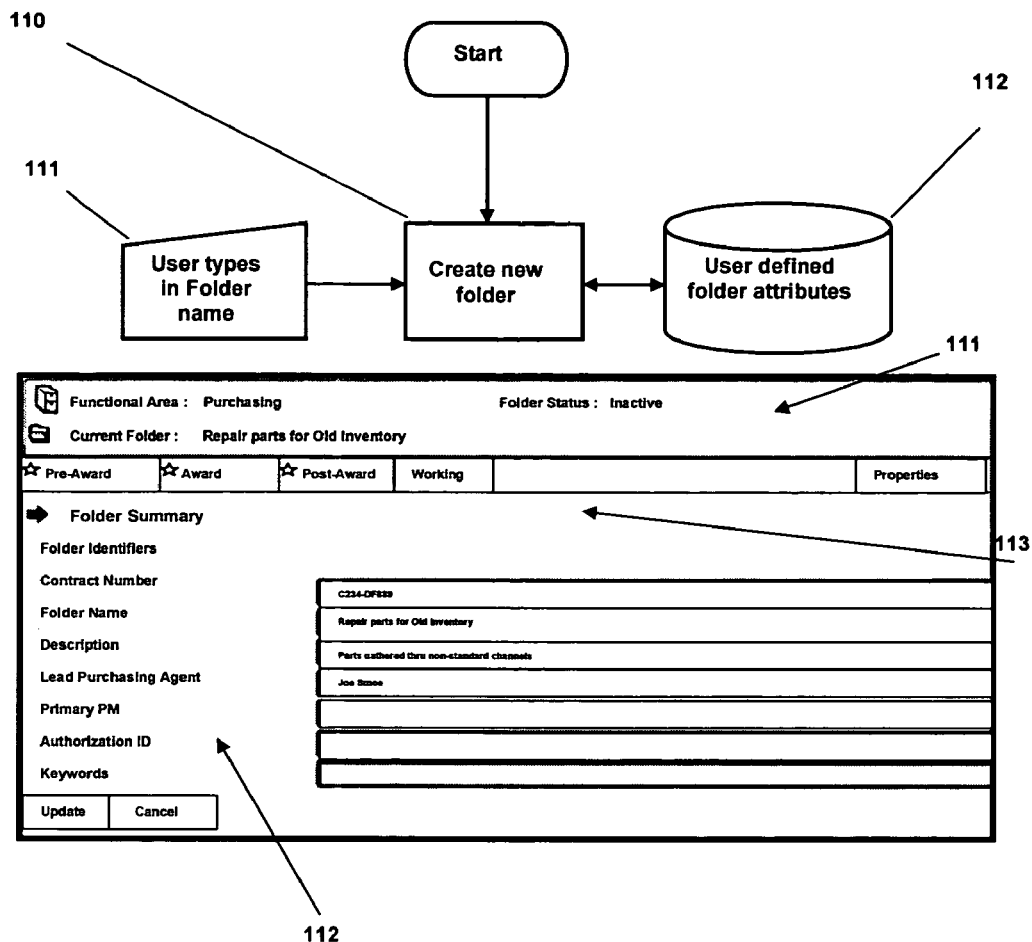
FIG. 3 shows the process flow for creating new folders and a screen shot of a newly created folder and the identifying information that is customizable for each Functional Area by the customer.
Figure 4:
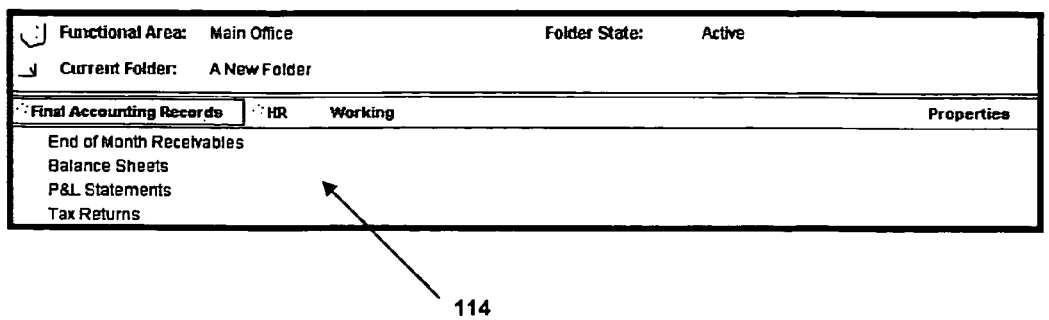
FIG. 4 is a screen shot of a newly created folder showing the consistency of the automatically created Tab structure for each folder in that Functional Area.

FIG. 2 shows an example of the first step a user performs as he begins to work in the application: the creation of a folder 110, by "clicking on" create folder icon 115 of FIG. 1. The user may name the folder 111 as he chooses. Typically, the folder name will correspond to a work-effort for which documents will be stored. A diagram of the folder creation process and a view of a newly created folder is shown in FIG. 3. New folders 110, identified primarily by the user entered folder name 111 acquire a structure predefined in the Administrative Module (see FIGS. 29-35) that includes user defined folder attributes or identifiers and Sections 113 that are applied consistently, every time a new folder 110 is created. As shown in the screen shot in FIG. 3, the user may fill in values for each of the folder identifiers 112, for each created folder. Along with identifiers 112 and Sections 113, a user-defined set of tabs is applied to each new folder 110, giving users a filing structure complete with applied permission levels for storage of electronic files. This is shown in FIG. 4. Each Section has its own defined Tab structure 114.

Figure 5:
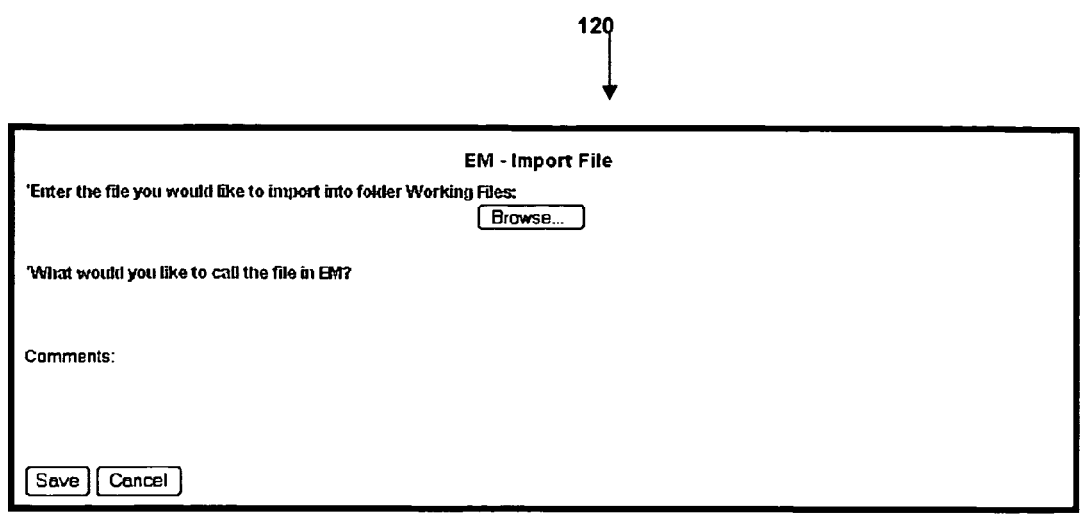
FIG. 5 is a screen shot of the user interface screen to import a new file.
Figure 6:
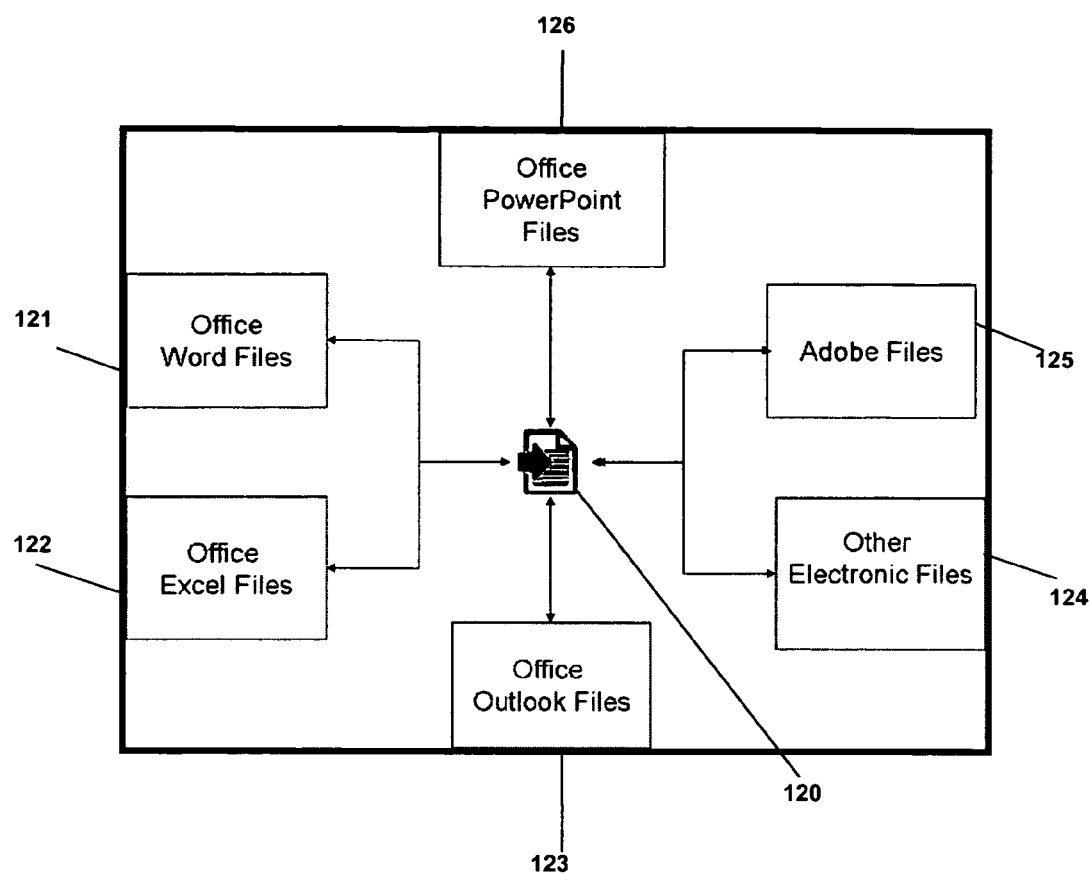
FIG. 6 is a diagram showing that all kinds of electronic files can be used in conjunction with this invention.

To facilitate the method of bringing in new files, once a folder has been created, this invention uses an import feature, as shown in FIG. 5, which will import any electronic file 120, by "clicking on" import electronic file icon 116 of FIG. 1. FIG. 6 is a diagram that depicts different electronic files, by way of example, that can be imported 120 with this invention. These can include office word files 121, office excel files 122, office power point files 126, adobe files 125, office outlook messages 123 and other electronic files 124. Although, these electronic files are listed above, this is not meant to limit the type of files that can be used. This application will utilize the associated application within the operating system of the local PC to access any electronic file. For example, if a .pdf file 125 is accessed within this invention, the version of Adobe Acrobat Reader™ that is associated to .pdf files within the operating system and installed on the local PC, will be used to view that file.

Figure 7:
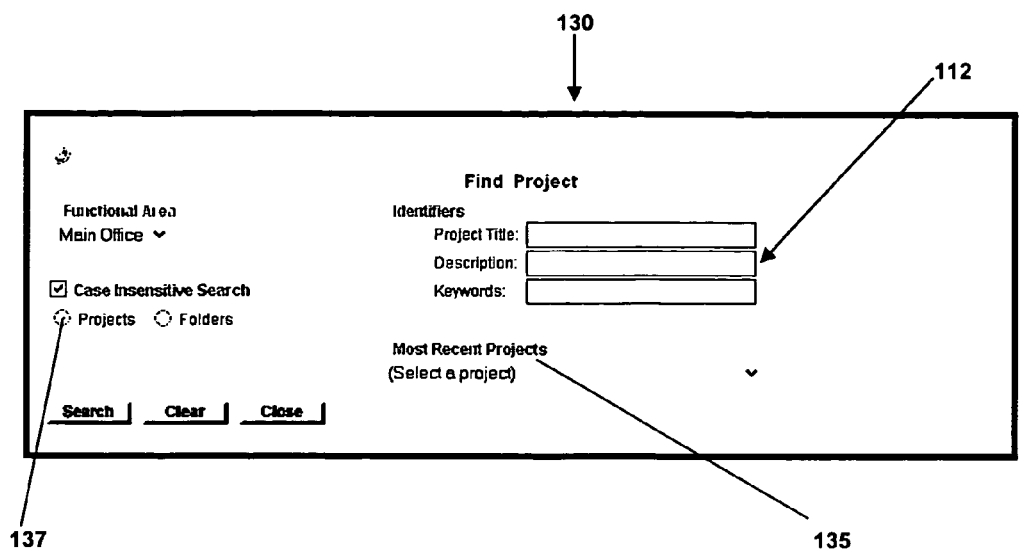
FIG. 7 is a screen shot of the user interface screen to search for projects, showing the different criteria that the user can choose.
Figure 8:
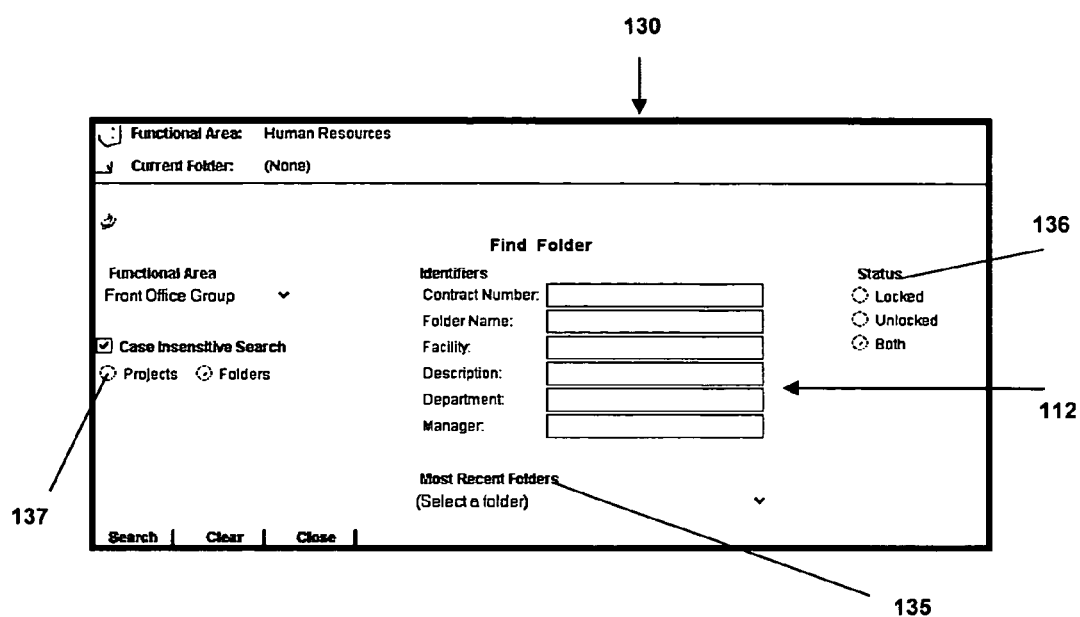
FIG. 8 is a screen shot of the user interface screen to search for folders, showing all the criteria used to select folders.
Figure 9:
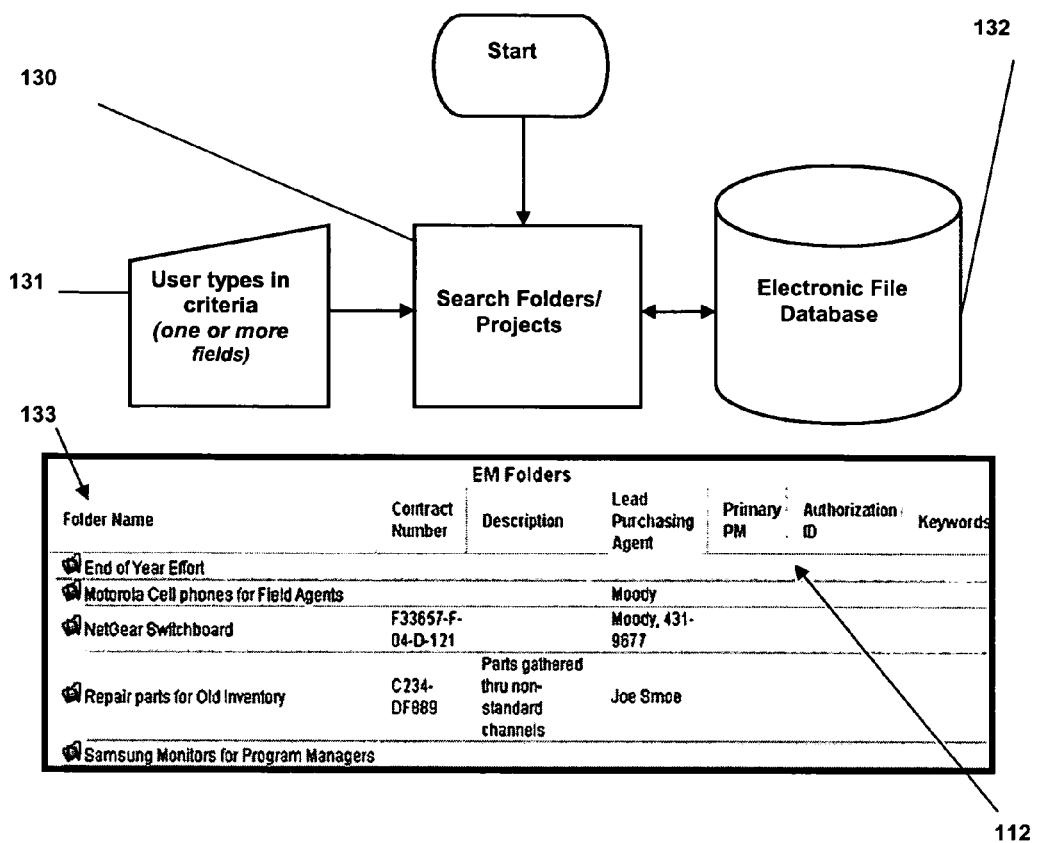
FIG. 9 is the process flow for searching for folders and projects and the types of results expected.

The purpose of identifiers, as shown in FIGS. 7 and 8, 112 is to assist users in later locating specific folders and projects. If a user chooses to use an identifier 112 such as a customer number, each customer can be assigned to a folder and be found by searching for that specific customer number. The same logic applies to projects. As another example, if a user chooses a customer type to be used as an identifier 112, all projects or folders that are associated to that customer type can be found by searching for that specific value 130, by "clicking on" search value icon 117 of FIG. 1. Searches 130 performed with these identifiers 112 are indicated in FIGS. 7 and 8. The user is also given an option to choose whether to search for projects or for folders 137. The user can refine the folder search with status type indicators 136. Alternately, the user may select a folder or project from the 5 most recent folders he has opened 135. The entire search process for this invention is shown in FIG. 9. The user provides criteria for the search 131. The search process 130 retrieves information from the database 132 for all folders which satisfy the criteria and displays a list 133 of those folders which includes all of their identifying information 112.

Figure 10:
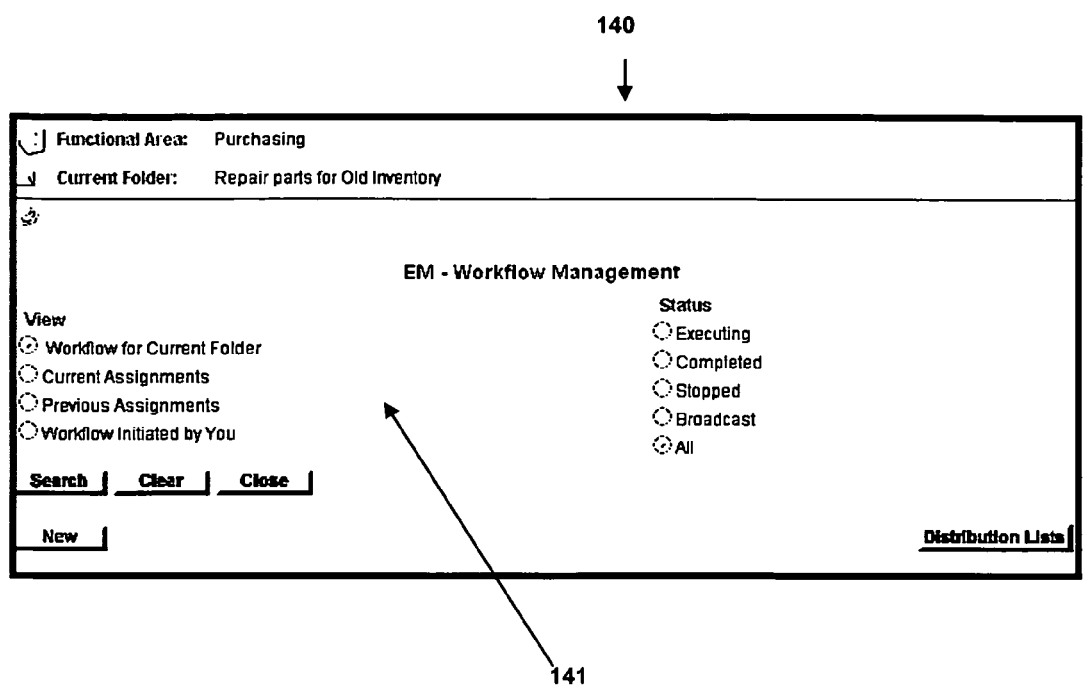
FIG. 10 is a screen shot of the workflow management screen, showing the criteria for searching workflows.
Figure 11:
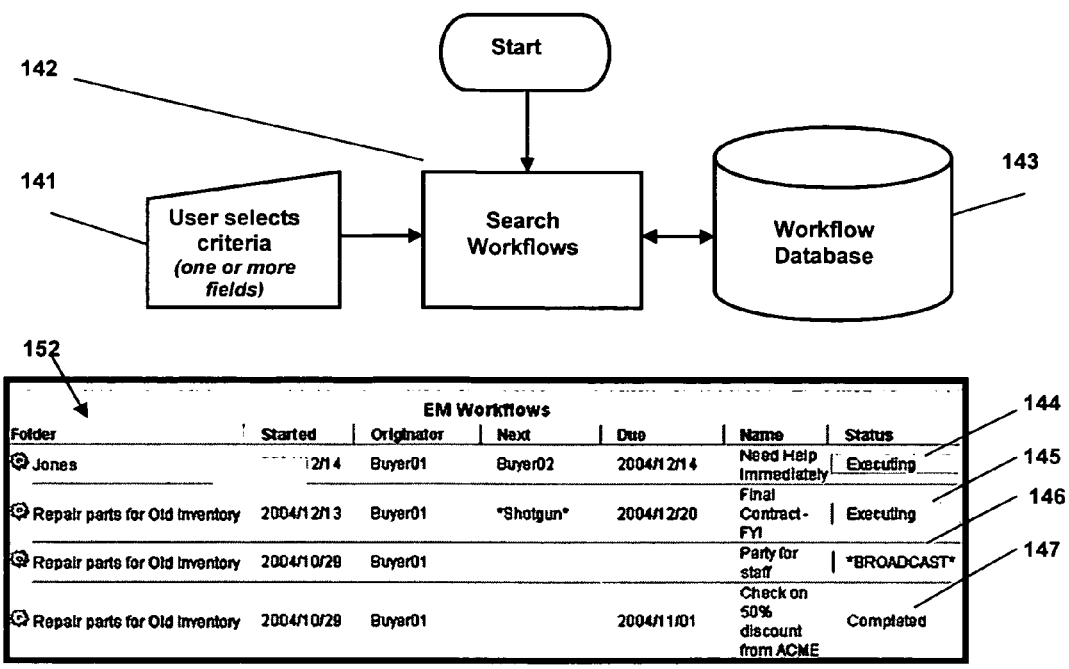
FIG. 11 shows the process flow for searching workflows and the expected results, along with status indicators.

Workflows are a crucial part to this invention. FIG. 10 shows the workflow management screen 140 presented to users, by "clicking on" workflow management icon 118 of FIG. 1, allowing them to choose to search for workflows assigned to a specific folder, currently assigned to them, previously assigned to them, or workflows they have initiated. Each of these classifications of workflows can be further limited by selecting a particular workflow status 141. FIG. 11 shows the workflow search process flow 142. Search criteria 141 provided are used to select from the workflow database 143. The results are displayed in the workflow list 152. This list of workflows 152 also includes a color coding of the status of each workflow. Examples in the list included in FIG. 11 are a workflow that is still executing but is past due in a first color (not shown) 144, a workflow that is still executing and has at least 2 more days until its due date in a second color (not shown) 145, a broadcast workflow needing no action in a third color (not shown) 146, and a completed workflow in a fourth color (not shown) 147. Although different colors are described, other identifiers can be used. The color and time are for the purpose of illustrating a preferred embodiment of the invention and not to be construed as limiting the invention.

Figure 12:
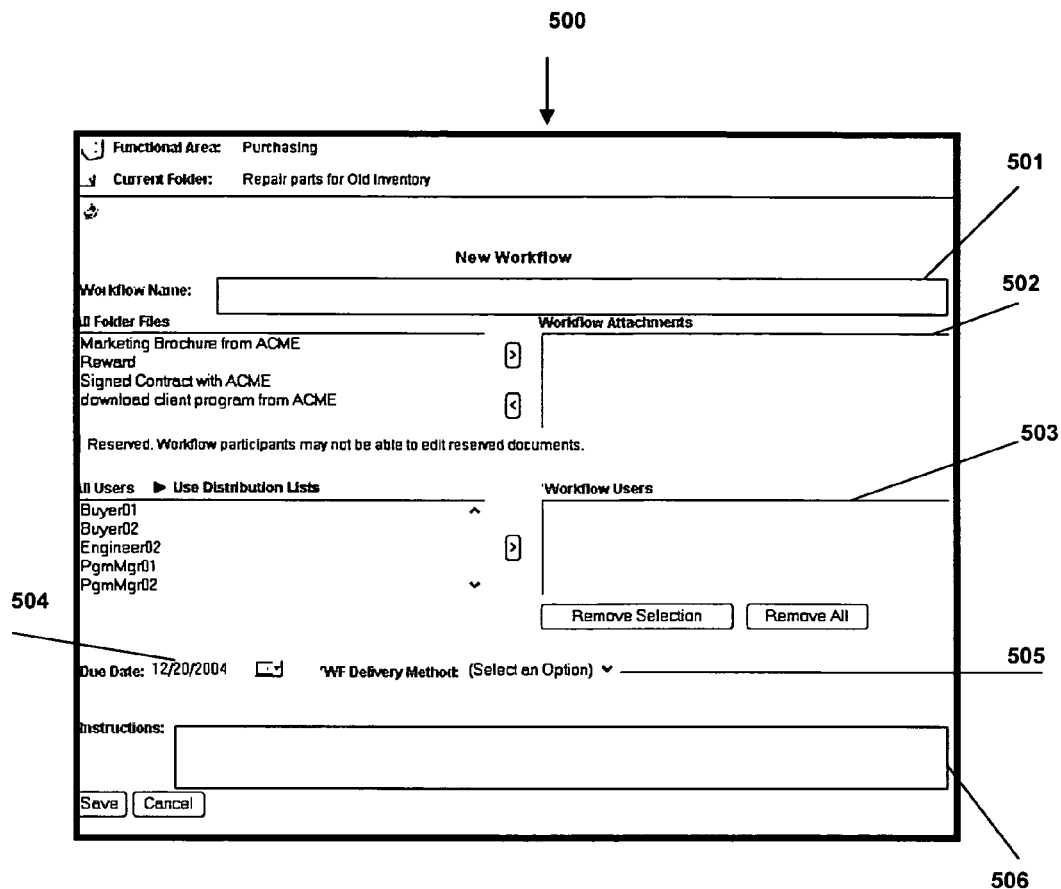
FIG. 12 shows the user interface for creating ad-hoc workflows, and the different components that comprise this invention's ad-hoc workflow.

This invention uses ad-hoc workflows, meaning workflows that are used on an as-needed basis. In the underlying document manager or workflow manager, workflow maps are created with blank information that is filled in as the workflow is used. FIG. 12 shows the user interface 500 that is used to fill in workflow parameters. The user types in a name for the workflow 501. He may select one or more electronic files to be copied as attachments to the workflow 502. The user selects the recipients 503 who will receive the workflow. The user selects a due date 504 for the workflow that will be used to track against and to show the status of the workflow. The user selects the delivery method for the workflow 505. This invention includes different types of delivery methods such as "sequential" where, in the order in which they appear in the selected list of users, each recipient receives his part of the workflow only after the previous recipient completes his part, "shotgun" workflows where the workflow is sent to all the recipients at the same time, and "broadcast" where the workflow is sent as an information workflow only, not requiring any completion of any tasks. The user provides instructions for the recipients 506. As the workflow is saved and made available to the recipients, e-mail notifications are sent to the appropriate users.

Figure 13:
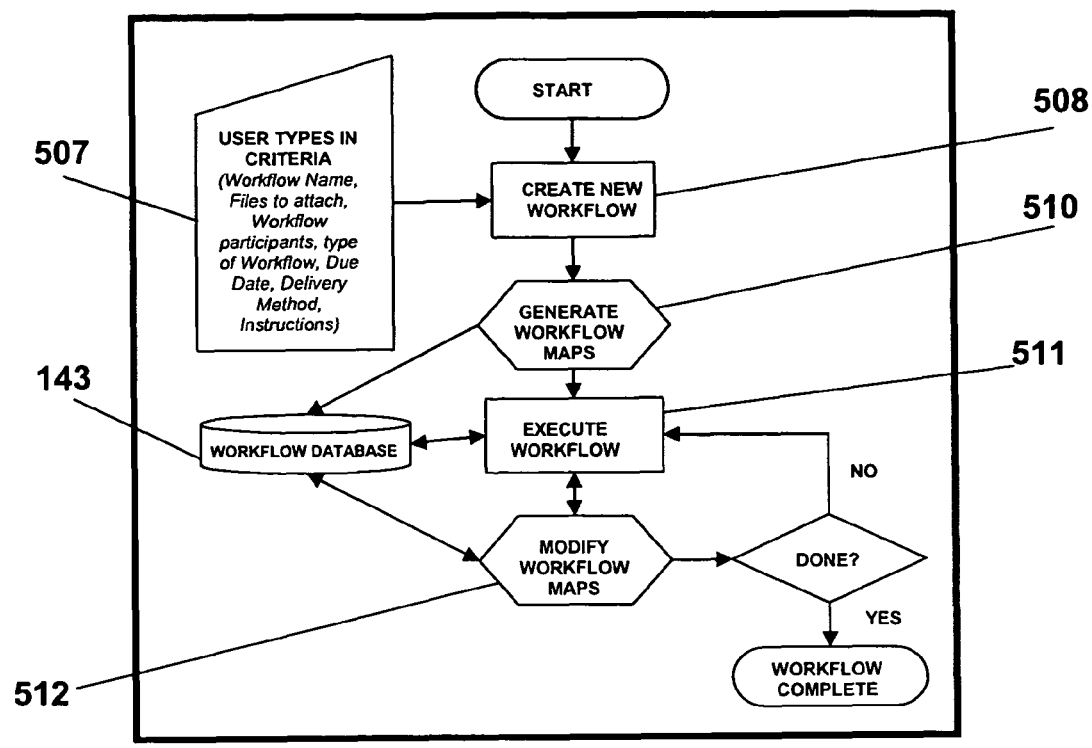
FIG. 13 shows the process flow for creating and executing this invention's workflows.

FIG. 13 shows the process flow of an ad-hoc workflow. Pre-mapped blank workflows exist in the underlying document management or workflow management database 143. A user creating a workflow is completely unaware of this. He provides the information necessary to make an instance of a workflow specific to his needs 507. When he submits or saves his work, i.e. completes the creation of his workflow 508, the application adds 510 the resulting workflow map to the workflow database 143. As the workflow is executed, that is designated recipients of the workflow access it 511, the workflow map is modified to reflect action that has been taken 512. This action will potentially include the addition of more document attachments and the reassignment of work by a recipient to some other user. It will include the comments each recipient is required to enter and the recording of the change of status from executing to complete. Note that completed workflows are not removed from the workflow database.

The benefit of utilizing an ad-hoc type of workflow is to eliminate complexity for the end user. Eighty-five percent (85%) of the work done with workflows can be accomplished with fifteen percent (15%) of the complexity. So, pre-mapped blank workflows allow the user maximum flexibility with a minimal amount of complexity to get the majority of their work accomplished. This is based on the assumption that eight-five percent (85%) of the work performed in any given business deals with unstructured data. The remaining fifteen percent (15%) deals with structured data and is accomplished by more formal business processes, either through vertically focused business applications (like accounts receivables, payroll, inventory maintenance, etc. . . . ) or through specifically mapped workflows focused on specific business processes that are repeatable.

Figure 14:
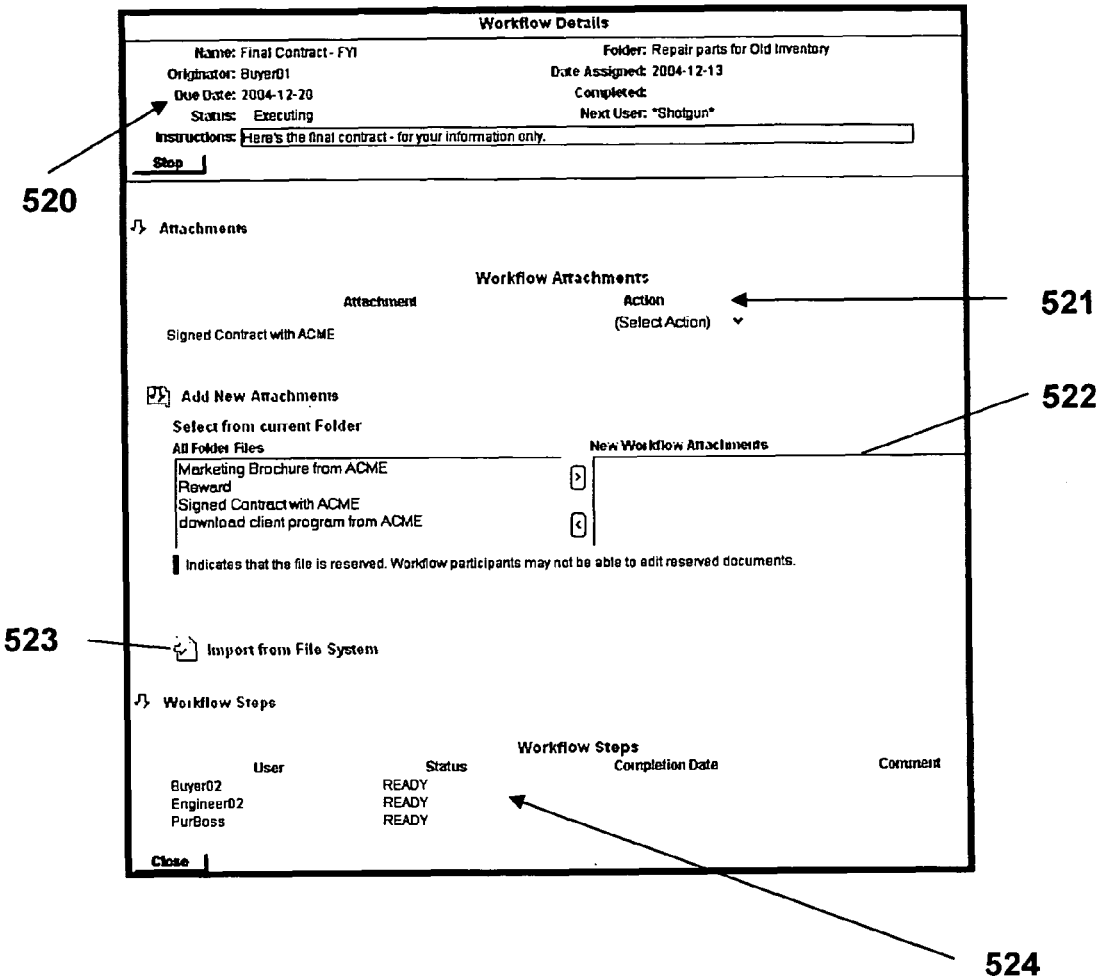
FIG. 14 shows the user interface for managing a workflow and its components.

As the ad-hoc workflow is accessed by its recipients, each participant is given the option to complete their task or to reassign the workflow to someone else. As the workflow is reassigned, the underlying mapping of the workflow is managed by this application, eliminating a level of complexity for the end user. FIG. 14 shows the user interface to perform the work associated with a workflow. The detailed workflow information 520 shows the instructions for the workflow and its present status. Files previously attached to the workflow are available for appropriate action by the user 521. He can view the documents and their version history. He may be able to edit the documents if his permission level allows and he is the current recipient of the workflow. He can make copies of the files for his own use. New workflow attachments 522 shows the capability to add copies of files, from whatever folder the user has open, to the workflow. The user may also add copies of files that have not been imported into EM 523. Workflow steps 524 allow the user to monitor the progress of the workflow.

Figure 15:
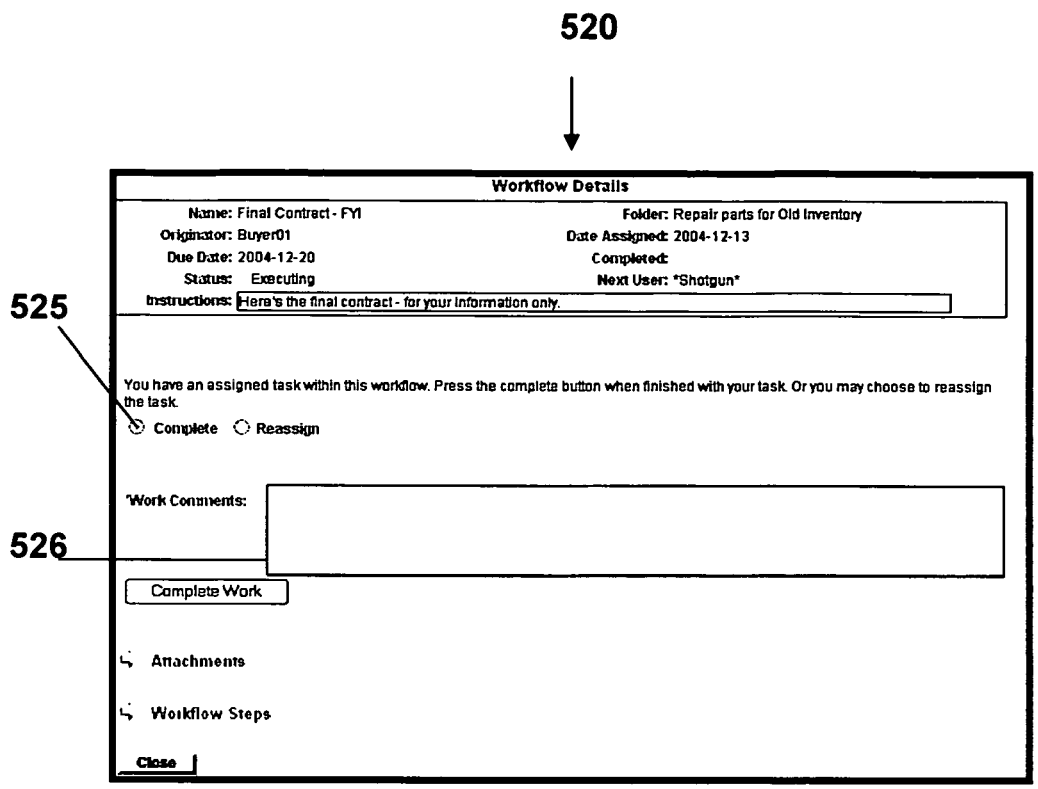
FIG. 15 shows the user interface for executing a task within a workflow.

FIG. 15 shows how the workflow is executed 520. The user interface is used either to indicate completion of this recipient's work or to reassign the workflow step 525 to another user. The latter is as easy as picking the user name from a drop down list (not shown). In either case, the user is required to enter comments 526 before his submission of 'complete' or 'reassign' will be accepted.

Figure 16:
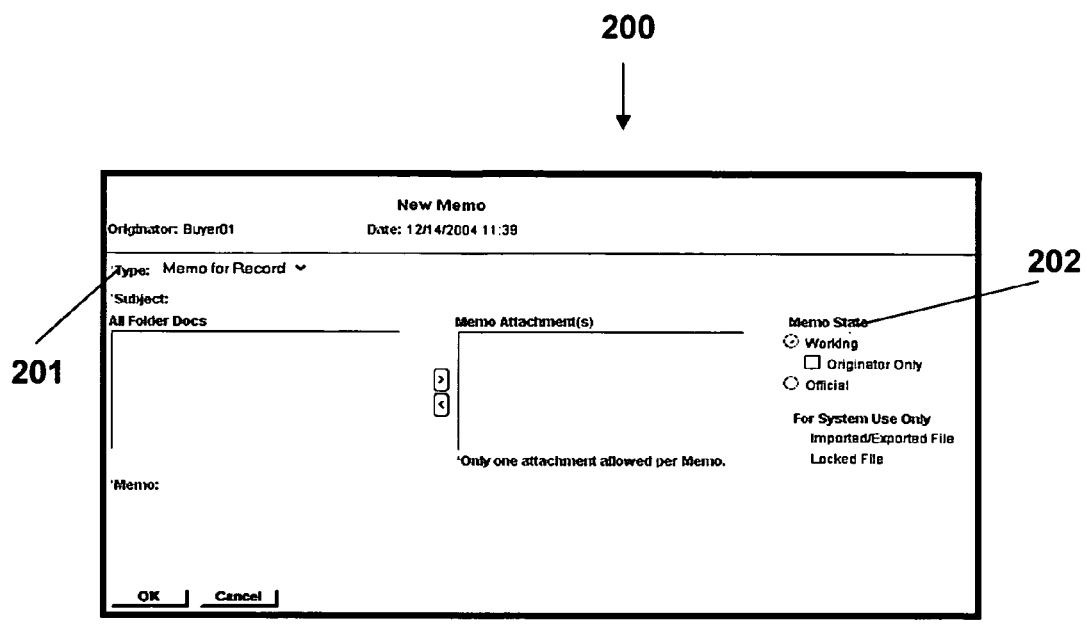
FIG. 16 shows the user interface for creating a memo and its components.

The memo 200 feature of the present invention provides another means of handling unstructured data, by "clicking on" memo icon 128 of FIG. 1. Conceptually, a memo is simply a note left in a folder which may or may not be related to a specific electronic file. FIG. 16 shows the user interface for creating memos. The user selects the type of memo to create 201. Examples of these types are "Memos for the Record" and "Phone messages". The user provides the subject of the memo. He may indicate one of the electronic files in the folder to associate with this memo. He fills in the actual text of the memo. Memos have many of the same action options as imported electronic files, including the ability to set states 202. See the discussion on document properties described with FIGS. 23-24.

Figure 17:
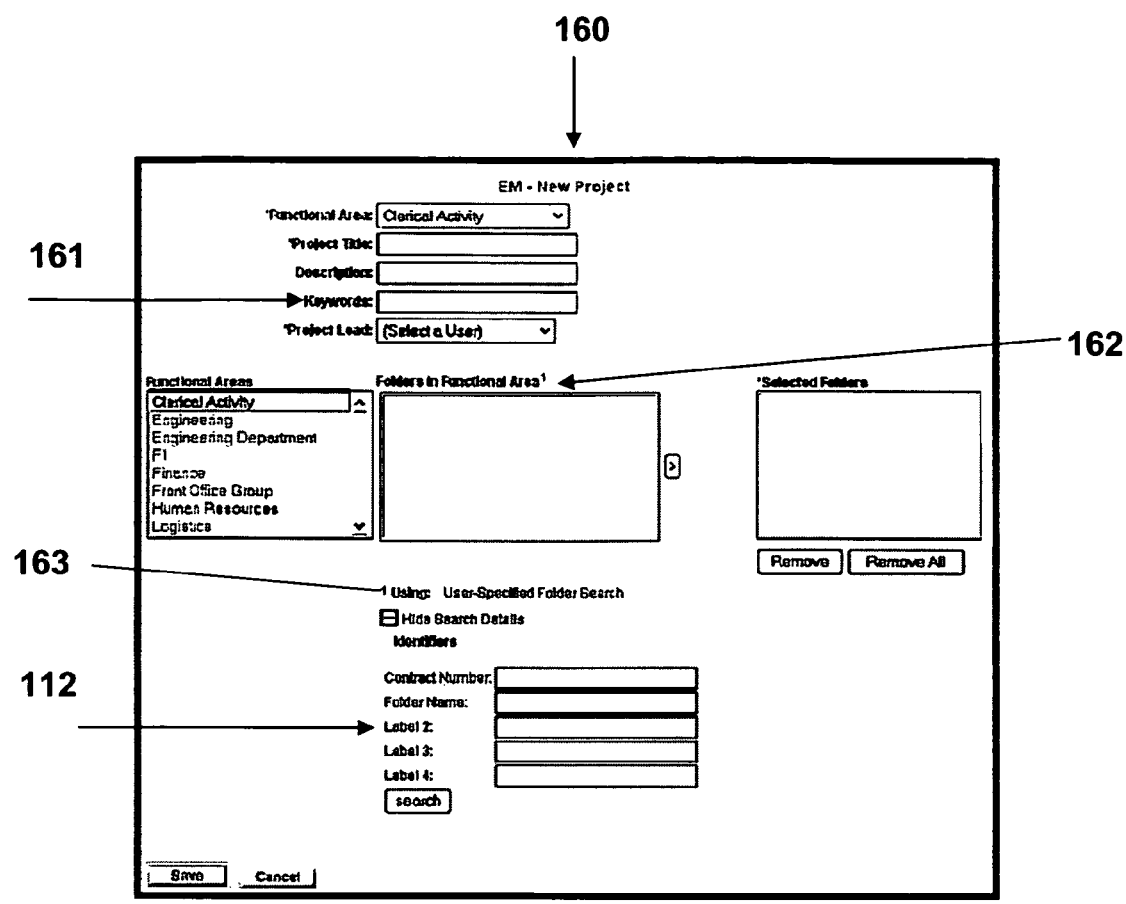
FIG. 17 shows the user interface for creating new projects and how it incorporates existing folders and applies identifying information to that project.
Figure 18:
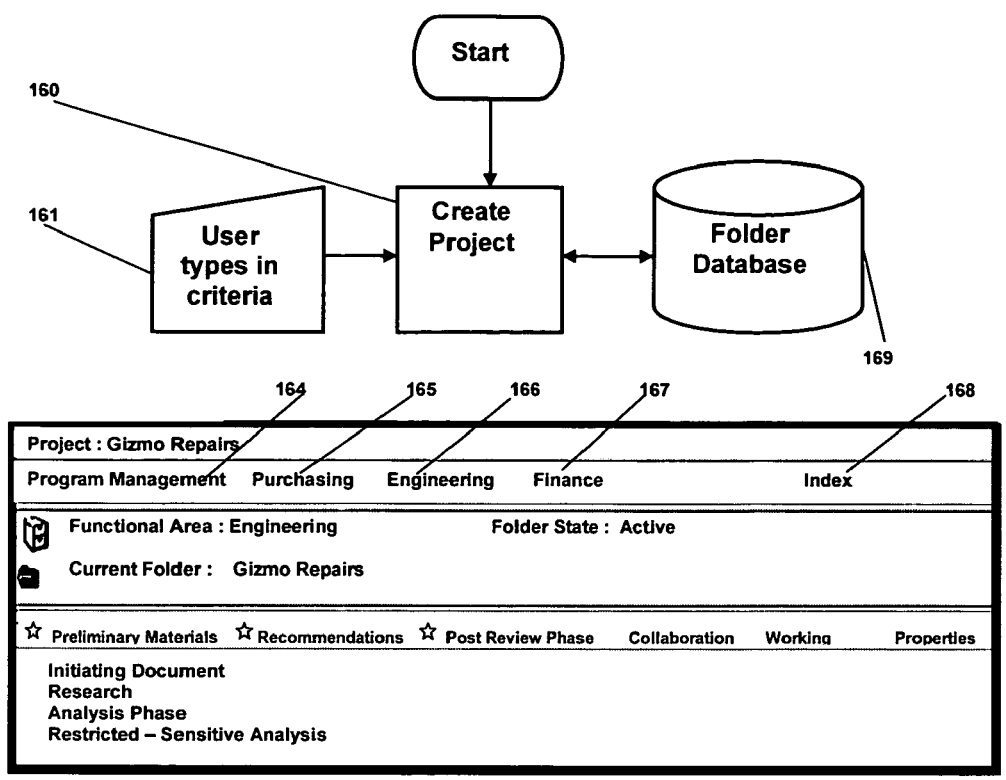
FIG. 18 shows the process flow for creating projects, and a screen shot of a newly created project and its components.

FIG. 17 shows the user interface for creating projects 160, by "clicking on" create project icon 119 of FIG. 1. A "project" in this invention is a collection of one or more folders, with a separate set of identifying information. A set of identifiers 161 is entered that have been established for projects. As in creating folders and typing in the identifying information for the folder, each project has its own identifying information. In this example, it is "description" and "keywords". A user interface for selecting folders within Functional Areas 162 is provided. Another way of locating folders to include in the project 163 is by searching on folder identifiers 112 using a method very similar to the project/folder search explained earlier. FIG. 18 shows the flow for creating projects and the elements of a created project. As detailed in FIG. 17, the user provides identifying values for the project and specifies the contents 161. The project is created 160 and the results are stored in folder database 169. In this figure, project management 164, purchasing 165, engineering 166 and finance 167 show the Functional Areas that have a folder included in this project example. A project's index 168 is a selected subset of the tabs that are part of the composite group of tabs from all of the folders represented in the project. Its purpose is to facilitate navigation through the project.

FIG. 19 shows the chronology log 170 that is used to track events in each folder, by "clicking on" chronology log icon 127 of FIG. 1. As the folder is created, an event is logged into this list. As workflows are created and worked, events are logged 173. As users access folders and look at documents or change the status of the folder 172, events are logged. Users may add free-form comments of their own 171 to further document events.

FIG. 19 shows the chronology log 170 that is used to track events in each folder. As the folder is created, an event is logged into this list. As workflows are created and worked, events are logged 173. As users access folders and look at documents or change the status of the folder 172, events are logged. Users may add free-form comments of their own 171 to further document events.

Figure 20:
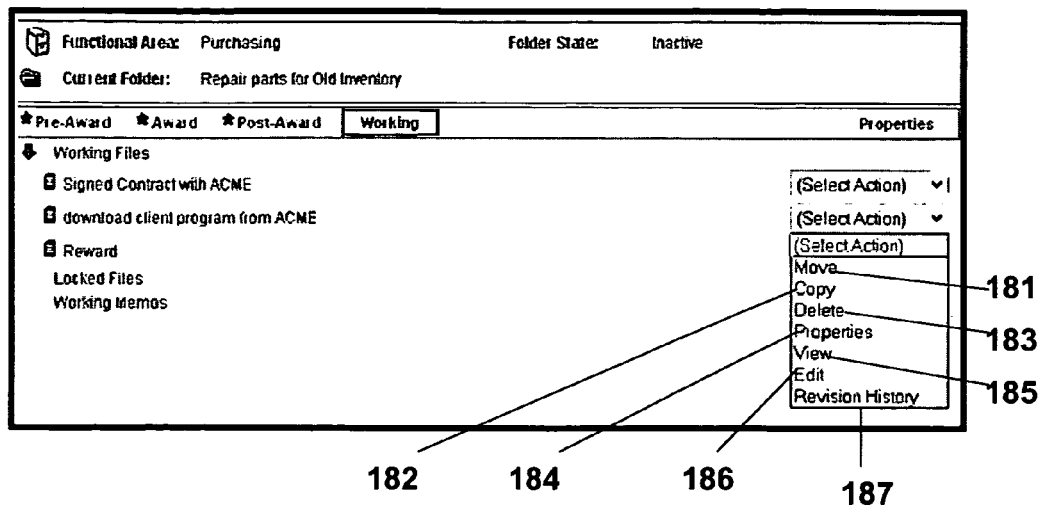
FIG. 20 shows this invention's options for managing electronic files.
Figure 23:
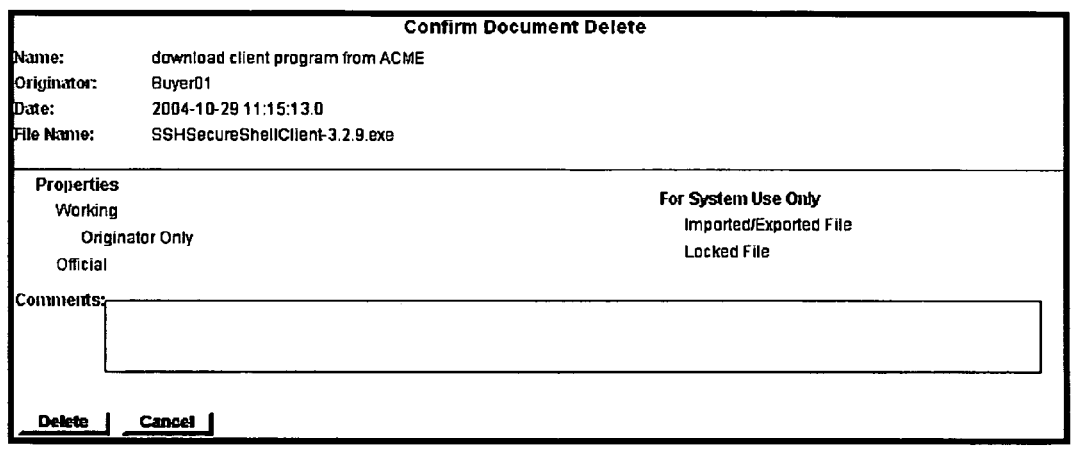
FIG. 23 shows the user interface for deleting electronic files.
Figure 24:
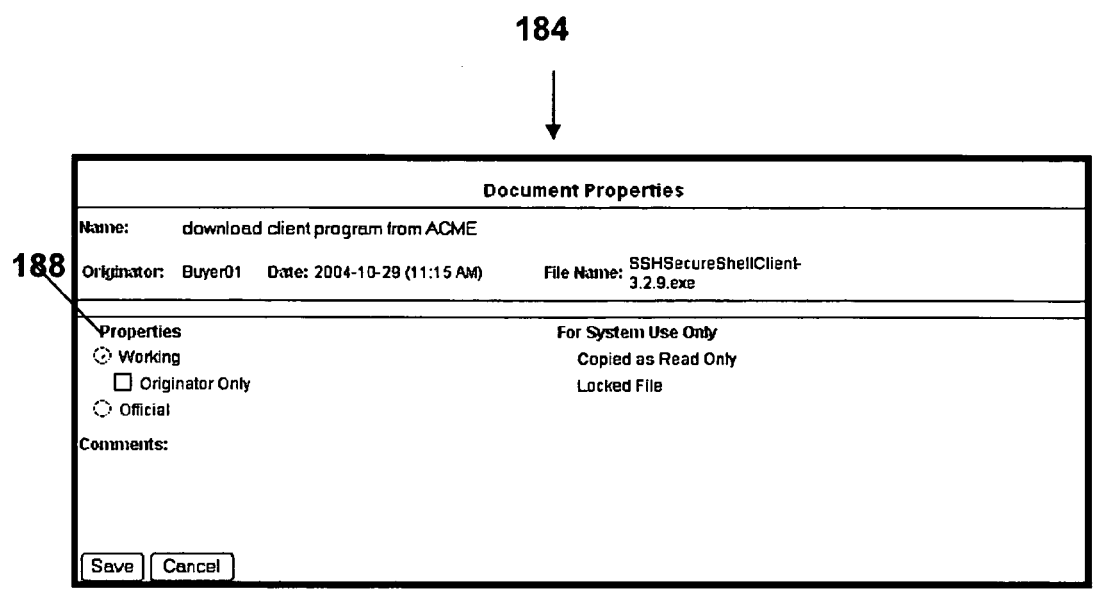
FIG. 24 shows the properties of electronic files that are managed in this invention.

FIG. 20 shows the basic document management capability 180 in this invention: move 181, copy 182, delete 183, properties 184, view 185, edit 186, and revision history 187. Only the options that are currently allowed, based on the user's permissions and the file's status, will appear in the select-action list. FIG. 21 shows the user interface for moving electronic files 181 from one Section to another. FIG. 22 shows the user interface for copying electronic files 182. The location of the resulting copy can be any folder, including the current one, as long as the user has appropriate permissions to add a file to that location and the file name is not a duplicate. FIG. 23 shows the user interface for deleting electronic files 183. FIG. 24 shows the user interface for changing the document properties 184. This includes choosing between working and official status and toggling the originator-only flag on and off 188. When a file has been marked as official, it cannot be edited or deleted, however it can be moved to an Official Section of the folder. (See discussion of Official vs. Working Sections in connection with FIG. 33). When a file is flagged as "originator-only", the system will ensure that the originator of that file is the only one who can change the contents or the status of that file.

Figure 25:
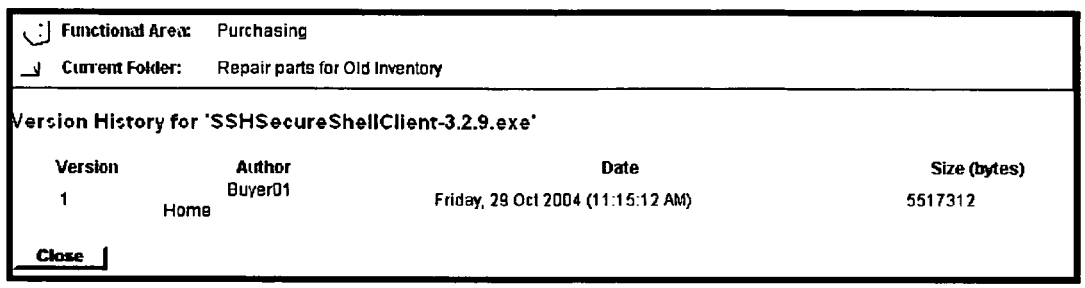
FIG. 25 shows the user interface for reviewing versions of electronic files.

FIG. 25 shows that the user can track previous versions of an electronic file 187. Each time a change is made to a file a new version is created. Version history allows a user to view the contents of each earlier version as well as see at a glance who was responsible for creating that particular version and when it occurred.

Figure 26:
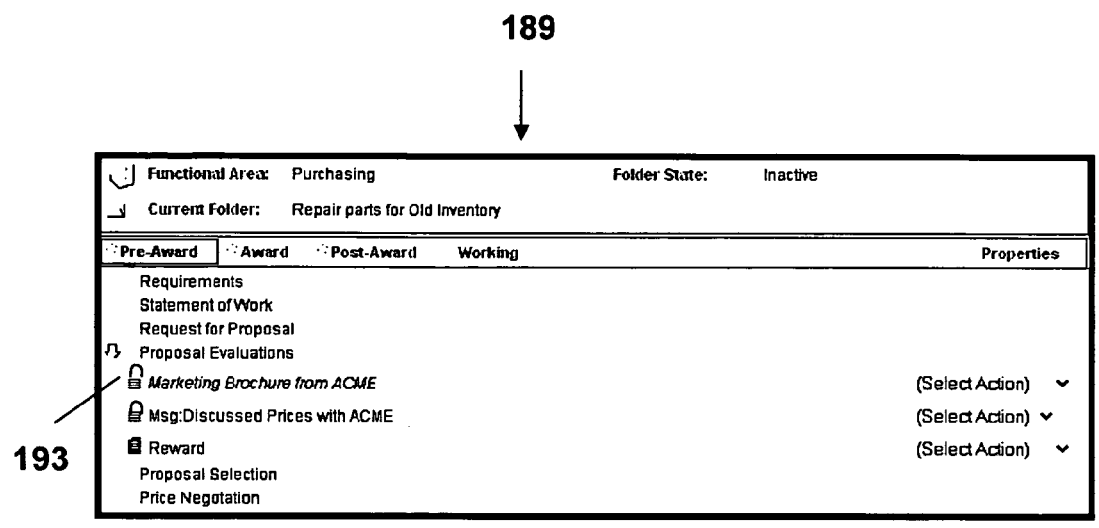
FIG. 26 shows the folder characteristics and different symbols used to indicate some of the different states of the electronic files.

FIG. 26 shows how different status indicators are shown to the user 189. For example, files that have been locked 193 as a result of locking down a folder are indicated with a padlock icon. In addition, different colored file icons can be used to show official files, such as showing working files, and so on (not shown).

Figure 27:
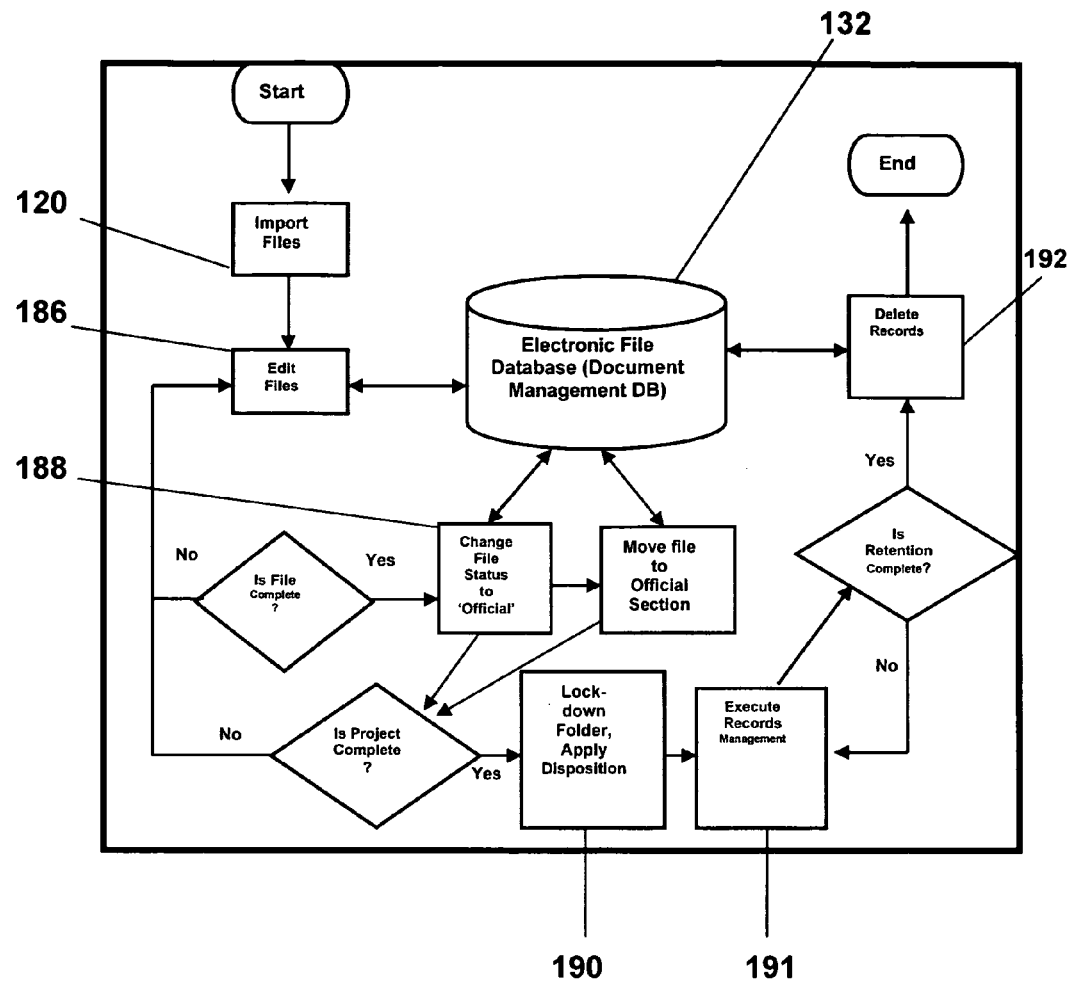
FIG. 27 shows the process for managing electronic files in folders for the full life cycle of the folder.

FIG. 27 is a process flow for the lifecycle of an electronic file. After a file has been imported 120 into this invention, it is available for editing 186 and for collaborative efforts, all the while stored in a secured, non-visible, database 132, with a full set of permissions. When the file has been completed, it is marked as "Official" 188 and is not available for further edits. For further clarity in file organization, an "Official" file is usually moved to an "Official" Section 181. If for some reason, the file requires further edits after being made "Official" 188, it can be moved out of the "Official" Section 181 and changed back into a working file until the necessary changes have been made. Then it can become Official 188, and be moved 181 once again. When all work is completed, the entire folder can be "locked down" 190. This means that no files in Official Sections can be edited. However, if a new file needs to be added to the folder, it can still be imported and edited in the Working Section of the folder. But, once it has been made Official 188, it cannot be undone. Once a folder has been "locked down" 190 it is also available to apply a records retention policy 191. This invention will allow a user with appropriate permissions to delete the folder once the retention period has expired 192. All the files in the folder will be destroyed, but the essence (metadata or identifiers and the chron log) will be maintained for the life of the application.

FIG. 28 shows a more detailed look at the Records Management capability of this invention. The user interface to Lock Down the folder 190 is shown along with the user interface to apply the retention policy information to the folder 191, which can include destruction date, batch number, and the approved disposition authority. The user interface for putting a hold on the folder to ensure that it is not deleted 194 is also provided. This can be used when extenuating circumstances require that information be available for a longer time than was originally determined. Once the hold is lifted, and the retention period has expired, the folder is available for destruction.

Figure 40:
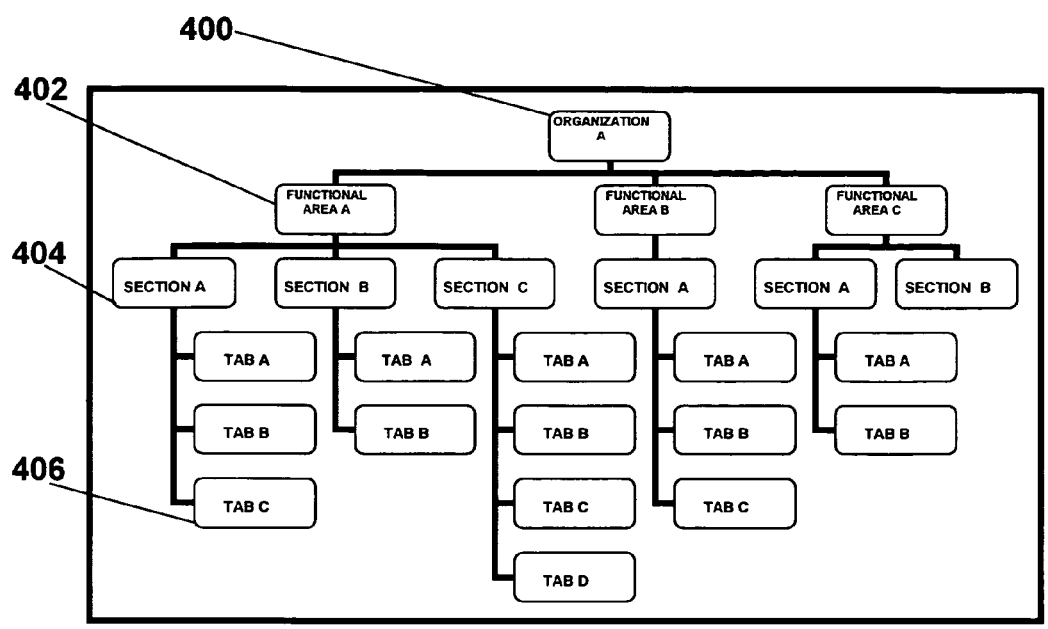
FIG. 40 shows the organizational structure behind the Administrative module.

The next set of figures detail the functionality available in the Administrative Module included as part of this invention. This module allows the user to customize his implementation of this invention. FIG. 40 shows how the Administrative Module handles the data that defines the specific structure for each implementation. Organizations 400 are created first, then Functional Areas 402. Sections 404 can be created for each Functional Area 402 and Tabs 406 are created for Sections 404. Users are then created independently from this structure, assigned to appropriate organizations, modifying permission levels for that user in each appropriate Functional Area 402.

Figure 29:
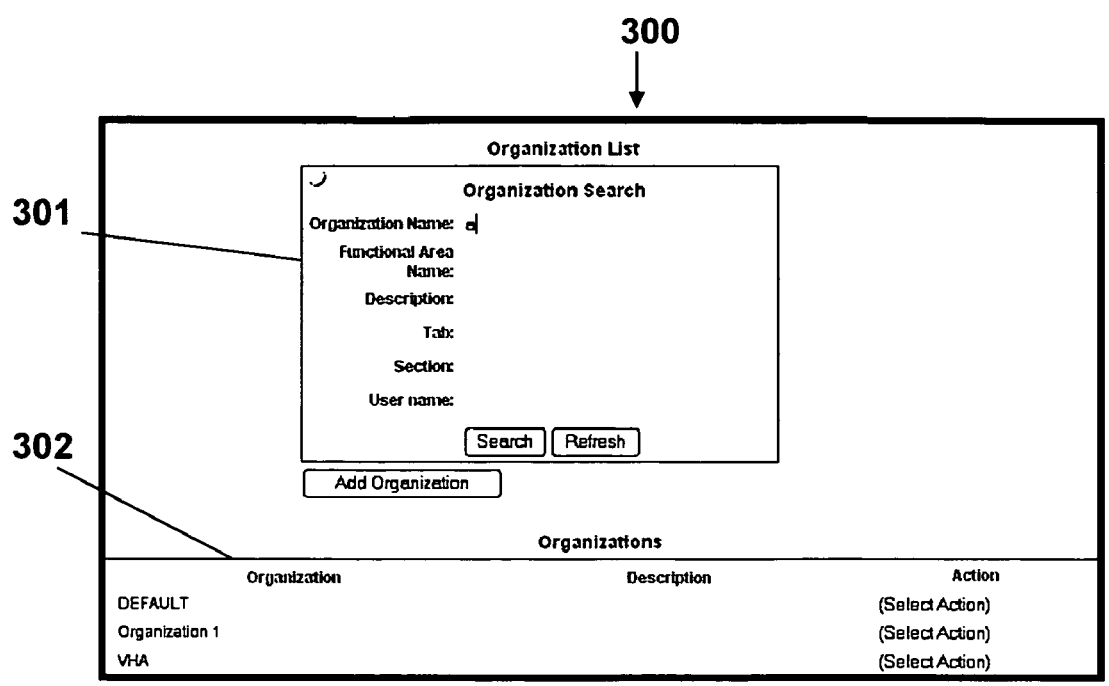
FIG. 29 shows the opening screen in the Administrative Module used to search for and manage Organizations.

FIG. 29 shows the user interface for creating and managing the Organizations for the implementation 300. This invention's versatility is shown by the Organization searching mechanism 301 that is used throughout this module. Users can just click on the search button to search all Organizations, or add any part of one of the available fields to use the typed information as search criteria. For example if the user wants to find all the Organizations that have "Sales" as part of the Organization Name and has a person named "Joe" as part of the Organization, he can just type "sale" or "sales" in the Organization Name and "Joe" in the User Name field then click search. This searching mechanism 301 works the same throughout the rest of these figures. Additionally, as the results are displayed for the user, then he can select which column will be the basis for sorting the contents. Clicking on the directional arrow icon next to the column name 302 selects that column and also allows the user to toggle between ascending and descending order. This too operates in the same fashion throughout this module.

FIG. 30 shows the user interface for creating and managing Functional Areas for the implementation 310. FIG. 31 shows more of the details for editing the Functional Areas 311. Each Functional Area has its own specifically assigned permission levels 312. These permissions relate to actions that occur at the folder level. Folder identifiers 112 are added and maintained for each Functional Area.

FIG. 32 shows the user interface for creating and maintaining the Sections 113 for the implementation. FIG. 33 shows the details for editing a Section. Sections can be created and used as Official Sections or Working Sections 323. Only electronic files whose status has been set to "official" may be located in Tabs contained in Official Sections. When a folder is "locked", only the electronic files in the Official Sections are affected. The intention of this feature is to clearly separate final or "official" files that should become part of permanent records. There can be as many Official and/or Working Sections within a Functional Area as the user needs.

Figure 35:
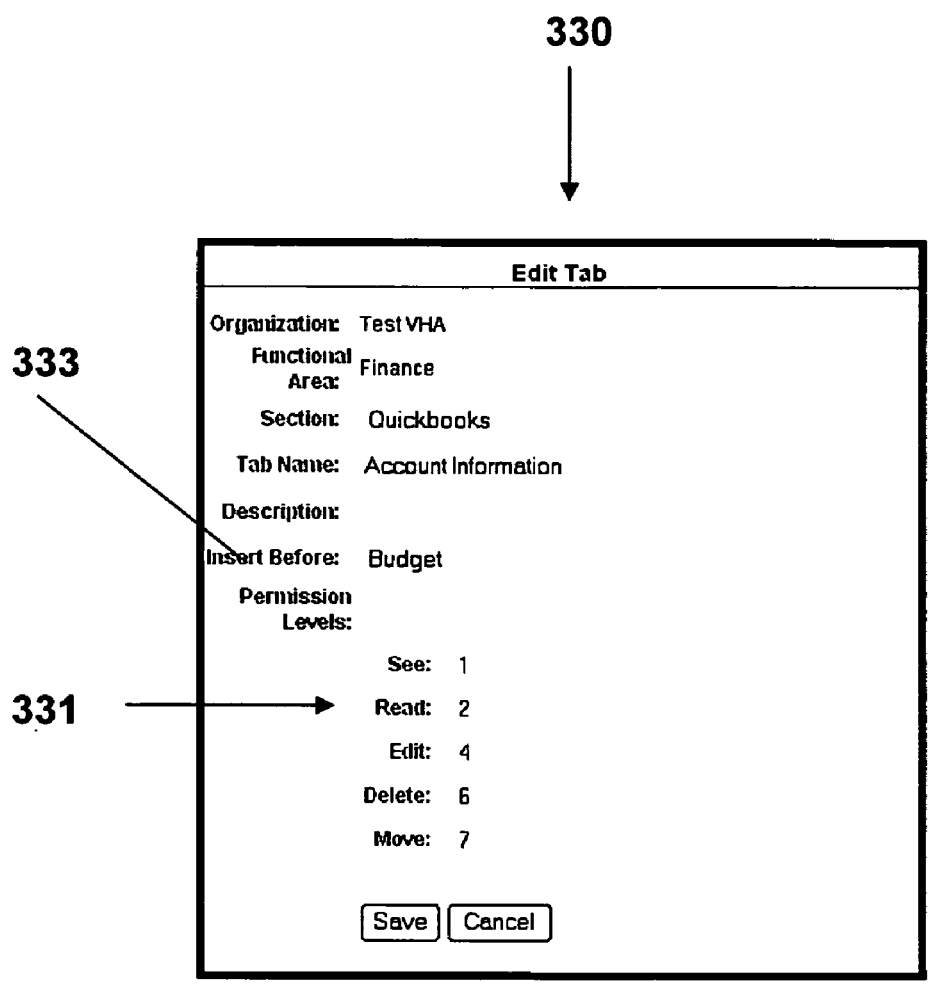
FIG. 35 shows the user interface in the Administrative Module used for editing Tabs.

FIG. 34 shows the user interface for creating and managing Tabs 321. FIG. 35 shows more of the details for editing Tabs, assigning a Tab to a Section, managing the order of the Tabs, and setting the permission levels for each Tab 330. The user controls the order in which Tabs display within a Section 333. Tab level permissions 331 relate to actions appropriate to the electronic files that the Tab will contain.

FIG. 36 shows the user interface for creating and managing Users 340 in this invention. Detailed search parameters 341 are available for searching for Users. FIG. 37 shows the user interface for creating Users 350, assigning them to Organizations and Functional Areas and setting the appropriate permission levels for the User.

Figure 38:
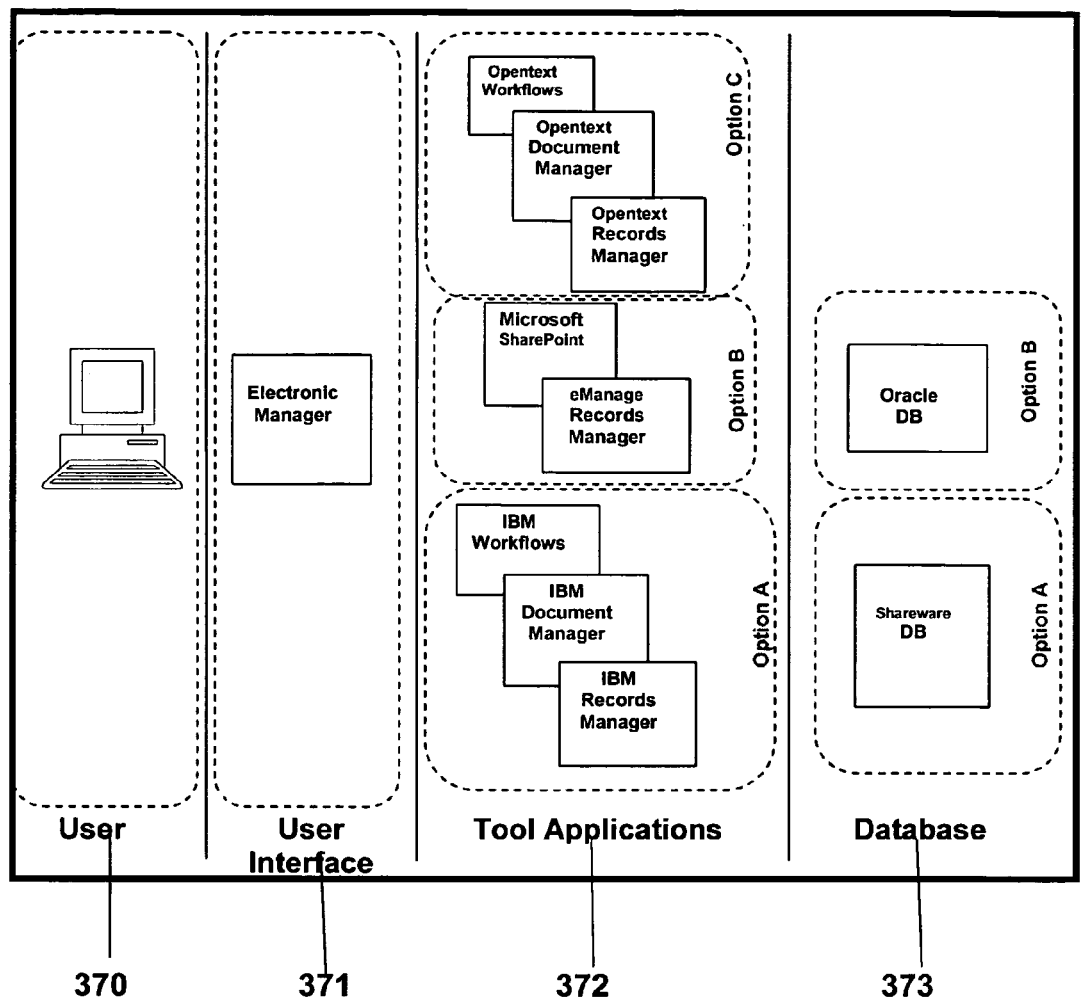
FIG. 38 shows the building blocks that make up this invention's total solution.
Figure 39:
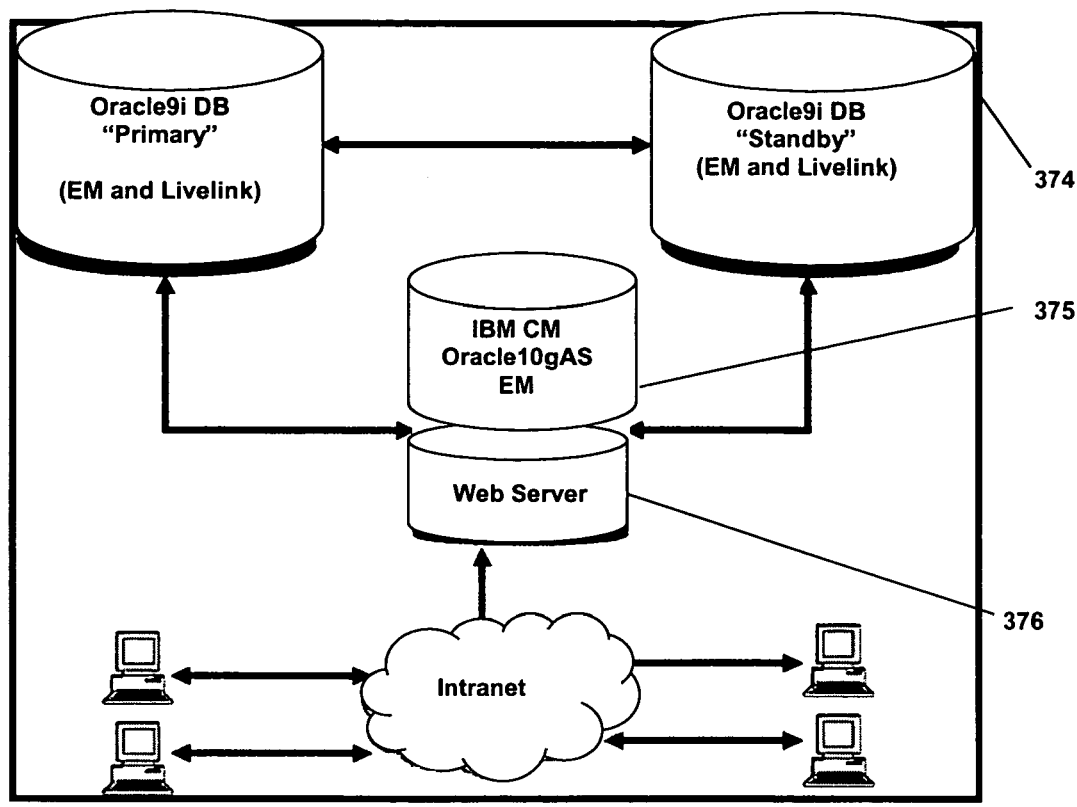
FIG. 39 shows one possible architecture implementation of this invention.

FIG. 38 depicts the layers that comprise this invention. As shown the layers can include a user layer 370, user interface 371, tool applications 372, and database 373. One of the key benefits to this particular solution is that it is very modular in its construction. This means that the same Electronic Manager user interface 371 can be established and other pieces swapped out and replaced. This invention is not limited by the choice of any one particular database. An Oracle™ database or a shareware database are two current options. This invention can operate with different third-party applications for workflows, document management and records management. For example, this invention can utilize the workflow management tool, the document management tool and the records management tools within the Opentext Livelink suite of tools. Then the user could decide that they want to utilize a different suite of tools. This invention is built to allow a technical administrator to swap out the Opentext tools and replace them with another set of tools, without interruption to the user interface. This eliminates user retraining. FIG. 39 shows, as an example, the actual architecture that was used in one implementation utilizing an Oracle™ database 374 and Opentext tools 374 that also used the Oracle™ database. In this particular example, the EM application runs under Oracle™ 10gAS 375 behind a web server 376.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Although the invention has been described in detail with particular reference to these preferred embodiments, other embodiments can achieve the same results. It is anticipated that the software that utilizes the method will continue to change the appearance of its user interface and evolve. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for managing a process and storage of electronic files utilizing a dynamically created and modifiable workflow, without a preset workflow map, for data, the method comprising the steps of:
   a) at the request of the user creating a new workflow without the preset workflow map by allowing a user to task users with tasks to be performed to set electronic files is a set order with a set time period;
   b) at any time during the workflow, tasked and administrative users modifying the entire workflow by:
      i) selecting one or more electronic files to attach to the workflow or one or more electronic files to modify from the workflow;
      ii) selecting one or more additional tasked users for the workflow;
      iii) automatically transmitting the workflow to the one or more additional tasked users and saving the workflow and electronic files;
      iv) updating the tracked status of the entire workflow;
      v) transmitting the workflow to the one or more additional tasked users; and
      vi) saving the modified workflow and the modified or added electronic files;
   c) at designated times during the workflow, the tasked users performing the workflow tasks;
   d) at any time during the workflow, tasked users and administrative users making comments to the workflow;
   e) at any time during the workflow, tasked users and administrative users tracking and viewing the status of the workflow, the comments, timeliness, and currently tasked users;
   f) designating the modified workflow as official;
   g) locking down the workflow, electronic files, task statuses and comments in a final folder;
   wherein workflow comprises at least one folder comprising the electronic files, the workflows and workflow results;
   wherein the at least one folder comprises at least one section and at least one tab; and
   wherein the sections and tabs relate to specific documents or files, and wherein the permission levels are established for actions that occur at the folder and at the individual tabs.

2. The method of claim 1 wherein the workflow comprises a task name, a delivery method, recipient instructions and at least one due date.

3. The method of claim 2 wherein the delivery method comprises a member from the group consisting of sequential, shotgun and broadcast.

4. The method of claim 1 further comprising the step of saving a final workflow and the modified and added electronic files.

5. The method of claim 1 further comprising notifying one or more users of the status of the workflow.

6. The method of claim 1 further comprising the step of modifying or adding new electronic files to attach to the modified workflow.

7. A hardware system for managing a process and storage of electronic files utilizing a dynamically created and modifiable workflow, without a preset workflow map, for data comprising:
   a processor;
   means for at the request of the user creating a new workflow without the preset workflow map by allowing a user to task users with tasks to be performed to set electronic files is a set order with a set time period;
   means for modifying the entire workflow at any time during the workflow by tasked and administrative users by:
      means for selecting one or more electronic files to attach to the workflow or one or more electronic files to modify from the workflow in the processor;
      means for selecting one or more additional tasked users for the workflow;
      means for updating the tracked status of the entire workflow;
      means for transmitting the workflow to the one or more additional tasked users; and
      means for saving the modified workflow and the modified or added electronic files;
   means for performing the workflow tasks at designated times during the workflow by the tasked users;
   means for making comments to the workflow at any time during the workflow by tasked users and administrative users;
   means for tracking and viewing the status of the workflow, the comments, timeliness, and currently tasked users any time during the workflow, by the tasked users and administrative users;
   means for designating the modified workflow as official;
   means for locking down the workflow, electronic files, task statuses and comments in a final folder;
   wherein the workflow comprises at least one folder comprising the electronic files, the workflows and workflow results;
   wherein the at least one folder comprises at least one section and at least one tab; and
   wherein the sections and tabs relate to specific documents or files, and wherein the permission levels are established for actions that occur at the folder and at the individual tabs.

8. The system of claim 7 wherein the workflow comprises a task name, a delivery method, recipient instructions and at least one due date.

9. The system of claim 8 wherein the delivery method comprises a member from the group consisting of sequential, shotgun and broadcast.

10. The system of claim 7 further comprising a means for saving a final workflow and the modified and added electronic files in the processor.

11. The system of claim 7 further comprising a means for notifying one or more users of the status of the workflow.

12. The system of claim 7 further comprising a means for modifying or adding new electronic files to attach to the modified workflow.

13. A storage media comprising program instructions which are computer-executable to implement a management of a process and storage of electronic files utilizing a dynamically created and modifiable workflow, without a preset workflow map, for data, the storage media comprising:

program instructions that cause a creation of a new workflow at the request of the user without the preset workflow map by instructing a user to task users to perform tasks to set electronic files is a set order with a set time period;

program instructions to modify the entire workflow at any time during the workflow by tasked and administrative users by:

program instructions that cause a selection of one or more electronic files to attach to the workflow or one or more electronic files to modify from the workflow;

program instructions that cause a selection of one or more additional tasked users for the workflow;

program instructions that cause an automatic transmission of the workflow to the one or more additional tasked users and saves the workflow and electronic files;

program instructions that cause an update of the tracked status of the entire workflow;

program instructions that cause the workflow to be transmitted to the one or more additional tasked users; and program instructions that cause the modified workflow and the modified or added electronic files to be saved;

program instructions that cause the tasked users perform the workflow tasks at designated times during the workflow;

program instructions that cause tasked users and administrative users make comments to the workflow at any time during the workflow;

program instructions that cause tasked users and administrative users to track and view the status of the workflow, the comments, timeliness, and currently tasked users at any time during the workflow;

program instructions that designate the modified workflow as official;

program instructions that lock down the workflow, electronic files, task statuses and comments in a final folder;

wherein the workflow comprises at least one folder comprising the electronic files, the workflows and workflow results;

wherein the at least one folder comprises at least one section and at least one tab; and wherein the sections and tabs relate to specific documents or files, and wherein the permission levels are established for actions that occur at the folder and at the individual tabs.

14. The storage media of claim 13 wherein the workflow comprises a task name, a delivery method, recipient instructions and at least one due date.

15. The storage media of claim 14 wherein the delivery method comprises a member from the group consisting of sequential, shotgun and broadcast.

16. The storage media of claim 13 further comprising program instructions that cause a final workflow and the modified and added electronic files to be saved.

17. The storage media of claim 13 further comprising program instructions to notify the one or more users of the status of the workflow.

18. The storage media of claim 13 further comprising program instructions that cause a modification or addition of new electronic files to attach to the modified workflow.

* * * * *